(12) United States Patent
Sundberg et al.

(10) Patent No.: US 11,337,083 B2
(45) Date of Patent: May 17, 2022

(54) RADIO NETWORK NODE AND A WIRELESS DEVICE, AND METHODS THEREIN

(71) Applicant: Telefonaktiebolaget LM Ericsson (publ), Stockholm (SE)

(72) Inventors: Mårten Sundberg, Årsta (SE); Ulf Händel, Norsholm (SE); Jens Bergqvist, Linköping (SE); Birgitta Sagebrand, Linköping (SE); Olof Liberg, Stockholm (SE); John Walter Diachina, Garner, NC (US); Stefan Eriksson Löwenmark, Färentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 15/777,109

(22) PCT Filed: Dec. 8, 2016

(86) PCT No.: PCT/SE2016/051234
§ 371 (c)(1),
(2) Date: May 17, 2018

(87) PCT Pub. No.: WO2017/099660
PCT Pub. Date: Jun. 15, 2017

(65) Prior Publication Data
US 2018/0332484 A1   Nov. 15, 2018

Related U.S. Application Data

(60) Provisional application No. 62/266,018, filed on Dec. 11, 2015.

(51) Int. Cl.
*H04W 24/02* (2009.01)
*H04L 1/08* (2006.01)
(Continued)

(52) U.S. Cl.
CPC ........... *H04W 24/02* (2013.01); *H04L 1/0001* (2013.01); *H04L 1/08* (2013.01); *H04L 1/1671* (2013.01);
(Continued)

(58) Field of Classification Search
None
See application file for complete search history.

(56) References Cited

U.S. PATENT DOCUMENTS 6,751,444 B1   6/2004  Meiyappan
8,023,451 B2 *  9/2011  Swann ................. H04W 48/12
                                                              370/328

(Continued)

FOREIGN PATENT DOCUMENTS

CN    103650592 A    3/2014
CN    104427459 A    3/2015

(Continued)

OTHER PUBLICATIONS

Author Unknown, "Technical Specification Group GSM/EDGE Radio Access Network; Cellular system support for ultra-low complexity and low throughput Internet of Things (CIoT) (Release 13)," Technical Report 45.820, Version 13.1.0, 3GPP Organizational Partners, Nov. 2015, 495 pages.

(Continued)

*Primary Examiner* — Hassan A Phillips
*Assistant Examiner* — Gautam Sharma
(74) *Attorney, Agent, or Firm* — Withrow & Terranova, PLLC

(57) ABSTRACT

A Radio Network Node (RNN) and a method therein for providing improved robustness of a radio link between the RNN and a wireless device. The RNN and the wireless device operate in a communications network. The RNN transmits, towards the wireless device, a transmission with (Continued)

a first transmission mode associated with a first level of coverage extension. When a first period of time has elapsed, the RNN transmits, towards the wireless device, the transmission using a second transmission mode associated with a second level of coverage extension. The second level of coverage extension is higher than the first level of coverage extension.

17 Claims, 13 Drawing Sheets

(51) Int. Cl.
    *H04L 1/00*     (2006.01)
    *H04L 1/16*     (2006.01)
    *H04L 1/18*     (2006.01)

(52) U.S. Cl.
    CPC .......... *H04L 1/1685* (2013.01); *H04L 1/1896* (2013.01)

(56) References Cited

U.S. PATENT DOCUMENTS

| | | | |
|---|---|---|---|
| 8,805,446 | B2 | 8/2014 | Dominguez Romero et al. |
| 8,874,126 | B2 | 10/2014 | Jeong et al. |
| 9,532,300 | B2* | 12/2016 | Zhang ................... H04W 48/12 |
| 10,009,665 | B2* | 6/2018 | Kwon ............. H04N 21/64322 |
| 10,129,710 | B2* | 11/2018 | Lee ....................... H04L 12/189 |
| 2004/0052230 | A1 | 3/2004 | Soliman |
| 2004/0125776 | A1 | 7/2004 | Haugli et al. |
| 2007/0010256 | A1 | 1/2007 | Klabunde et al. |
| 2007/0286155 | A1 | 12/2007 | Kaikkonen et al. |
| 2009/0042582 | A1 | 2/2009 | Wang et al. |
| 2009/0111476 | A1 | 4/2009 | Hamalainen et al. |
| 2009/0207826 | A1 | 8/2009 | Bitran et al. |
| 2010/0278100 | A1* | 11/2010 | West ................... H04W 52/241 370/328 |
| 2010/0304738 | A1 | 12/2010 | Lim |
| 2010/0329211 | A1 | 12/2010 | Ou |
| 2011/0021154 | A1 | 1/2011 | Marinier et al. |
| 2011/0201333 | A1 | 8/2011 | Kwon et al. |
| 2012/0063302 | A1 | 3/2012 | Damnjanovic et al. |
| 2012/0088498 | A1 | 4/2012 | Xiao et al. |
| 2012/0113844 | A1 | 5/2012 | Krishnamurthy |
| 2012/0282934 | A1 | 11/2012 | Simonsson et al. |
| 2013/0102309 | A1* | 4/2013 | Chande ............... H04W 52/244 455/435.1 |
| 2013/0157680 | A1 | 6/2013 | Morita et al. |
| 2013/0223416 | A1 | 8/2013 | Michel |
| 2013/0294307 | A1 | 11/2013 | Johansson et al. |
| 2014/0050135 | A1 | 2/2014 | Zhang et al. |
| 2014/0064187 | A1* | 3/2014 | Yokoyama ............ H04W 28/18 370/328 |
| 2014/0126386 | A1* | 5/2014 | Beale .................... H04L 5/0069 370/252 |
| 2015/0017977 | A1 | 1/2015 | Ratasuk et al. |
| 2015/0043445 | A1 | 2/2015 | Xiong et al. |
| 2015/0078264 | A1 | 3/2015 | Han et al. |
| 2015/0092566 | A1 | 4/2015 | Balachandran et al. |
| 2015/0117233 | A1 | 4/2015 | Wong et al. |
| 2015/0271686 | A1 | 9/2015 | Jha et al. |
| 2015/0271763 | A1 | 9/2015 | Balachandran et al. |
| 2016/0029352 | A1* | 1/2016 | Wong ....................... H04L 1/001 370/315 |
| 2016/0316491 | A1 | 10/2016 | Axmon et al. |
| 2016/0337991 | A1* | 11/2016 | Zhang ...................... H04L 1/08 |
| 2017/0048802 | A1* | 2/2017 | Bucknell ............... H04W 48/16 |
| 2017/0063595 | A1* | 3/2017 | Ma .......................... H04L 29/08 |
| 2018/0359631 | A1 | 12/2018 | Balachandran et al. |
| 2019/0124602 | A1 | 4/2019 | Balachandran et al. |
| 2019/0349858 | A1* | 11/2019 | Jantzi ................... H04W 76/28 |
| 2019/0364408 | A1* | 11/2019 | Park .................. H04W 72/0446 |

FOREIGN PATENT DOCUMENTS

| | | |
|---|---|---|
| EP | 1928134 A2 | 6/2008 |
| EP | 2787671 A1 | 4/2013 |
| RU | 2358396 C2 | 6/2009 |
| WO | 2012093888 A2 | 7/2012 |
| WO | 2012173565 A1 | 12/2012 |
| WO | 2013053396 A1 | 4/2013 |
| WO | 2012170794 A1 | 12/2013 |
| WO | 2014077765 A1 | 5/2014 |
| WO | 2015012654 A1 | 1/2015 |
| WO | 2015042038 A1 | 3/2015 |
| WO | 2015116732 A1 | 8/2015 |
| WO | 2016007070 A1 | 1/2016 |
| WO | 2016028215 A1 | 2/2016 |

OTHER PUBLICATIONS

Author Unknown, "Technical Specification Group GSM/EDGE Radio Access Network; General Packet Radio Service (GPRS); Overall description of the GPRS radio interface; Stage 2 (Release 13)," Technical Specification 43.064, Version 13.0.0, 3GPP Organizational Partners, Nov. 2015, 113 pages.

International Search Report and Written Opinion for International Patent Application No. PCT/SE2016/051234, dated Mar. 24, 2017, 10 pages.

International Preliminary Report on Patentability for International Patent Application No. PCT/SE2016/051234, dated Apr. 9, 2018, 21 pages.

Office Action for Russian Patent Application No. 2018125135/08, dated May 16, 2019, 8 pages.

Written Opinion for International Patent Application No. PCT/SE2016/051234, dated Dec. 21, 2017, 4 pages.

First Office Action for Chinese Patent Application No. 201680072335.1, dated May 18, 2020, 17 pages.

Second Office Action for Chinese Patent Application No. 201680072335.1, dated Jan. 15, 2021, 15 pages.

Author Unknown, "Technical Specification Group Services and System Aspects; Service requirements for Machine-Type Communications (MTC); Stage 1 (Release 11)," Technical Specification 22.368, Version 11.6.0, 3GPP Organizational Partners, Sep. 2012, 21 pages.

Author Unknown, "Technical Specification Group Radio Access Network; Radio Resource Control (RRC); Protocol Specification (Release 12)," Technical Specification 25.331, Version 12.5.0, 3GPP Organizational Partners, Mar. 2015, 2225 pages.

Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.

Author Unknown, "Technical Specification Group Radio Access Network; Evolved Universal Terrestrial Radio Access (E-UTRA); Requirements for support of radio resource management (Release 8)," Technical Specification 36.133, Version 8.19.0, 3GPP Organizational Partners, Sep. 2012, 338 pages.

Author Unknown, "Technical Specification Group Radio Access Network; Evolved Universal Terrestrial Radio Access (E-UTRA); Physical layer procedures (Release 8)," Technical Specification 36.213, Version 8.8.0, 3GPP Organizational Partners, Sep. 2009, 77 pages.

Author Unknown, Technical Specification Group Radio Access Network; Evolved Universal Terrestrial Radio Access (E-UTRA); Radio Resource Control (RRC); Protocol specification (Release 8), Technical Specification 36.331, Version 8.17.0, 3GPP Organizational Partners, Jun. 2012, 215 pages.

Author Unknown, "Technical Specification Group Radio Access Network; Study on provision of low-cost MTC UEs based on LTE; (Release 11)," Technical Report 36.888, Version 2.0.0, 3GPP Organizational Partners, Jun. 2012, 43 pages.

Ericsson et al., "R1-124887: General considerations on coverage enhancements for MTC," 3rd Generation Partnership Project (3GPP), TSG-RAN WG1 #71, Nov. 12-16, 2012, 6 pages, New Orleans, USA.

(56) References Cited

OTHER PUBLICATIONS

Ericsson et al., "R1-124888: Required functionality for coverage enhancements for MTC," 3rd Generation Partnership Project (3GPP), TSG-RAN WG1 #71, Nov. 12-16, 2012, 4 pages, New Orleans, USA.
Ericsson, "Tdoc R2-150456: Random access procedure for low complexity and coverage enhanced UEs," 3rd Generation Partnership Project (3GPP), TSG-RAN WG2 #89, Feb. 9-13, 2015, 7 pages, Athens, Greece.
Ericsson, "R4-151491: Impact on RACH in enhanced coverage for MTC," 3rd Generation Partnership Project (3GPP), TSG RAN WG4 Meeting #74bis, Apr. 20-24, 2015, 4 pages, Rio de Janeiro, Brazil.
Etri, "R1-150520: Feedback enhancements for high-order MU-MIMO," 3rd Generation Partnership Project (3GPP), TSG RAN WG1 Meeting #80, Feb. 9-13, 2015, 7 pages, Athens, Greece.
Huawei, et al., "R1-140026: Considerations on PRACH repetition levels and power adjustment of PRACH," 3rd Generation Partnership Project (3GPP), TSG RAN WG1 Meeting #76, Feb. 10-14, 2014, 6 pages, Prague, Czech Republic.
Nec, "R2-151420: RAR for Rel-13 low-complexity UE and UE in enhanced coverage," 3rd Generation Partnership Project (3GPP), TSG RAN2 Meeting #89bis, Apr. 20-24, 2015, 3 pages, Bratislava, Slovakia.
RAN1, "R1-150920: LS on PRACH coverage enhancement," 3rd Generation Partnership Project (3GPP), TSG RAN WG1 Meeting #80, Feb. 9-13, 2015, 2 pages, Athens, Greece.
RAN1, "R2-151008: LS on PRACH coverage enhancement," 3rd Generation Partnership Project (3GPP), TSG RAN WG2 Meeting #89bis, Apr. 20-24, 2015, 1 page, Bratislava, Slovakia.
Sharp, "R2-150148: Consideration on coverage enhanced RACH for Rel-13 MTC UEs," 3rd Generation Partnership Project (3GPP), TSG RAN WG2 Meeting #89, Feb. 9-13, 2015, 4 pages, Athens, Greece.
Vodafone, "RP-121441: Updated SID on: Provision of low-cost MTC UEs based on LTE," 3rd Generation Partnership Project (3GPP), TSG RAN Meeting #57, Sep. 4-7, 2012, 6 pages, Chicago.
Non-Final Office Action for U.S. Appl. No. 14/441,479, dated Oct. 7, 2016, 27 pages.
Final Office Action for U.S. Appl. No. 14/441,479, dated Apr. 18, 2017, 29 pages.
Non-Final Office Action for U.S. Appl. No. 14/441,479, dated Oct. 6, 2017, 26 pages.
Final Office Action and Examiner-Initiated Interview Summary for U.S. Appl. No. 14/441,479, dated May 11, 2018, 27 pages.
Advisory Action and Examiner-Initiated Interview Summary for U.S. Appl. No. 14/441,479, dated Aug. 7, 2018, 6 pages.
Notice of Allowance and Examiner-Initiated Interview Summary for U.S. Appl. No. 14/441,479, dated Sep. 5, 2018, 15 pages.
Non-Final Office Action for U.S. Appl. No. 16/229,268, dated Jul. 11, 2019, 16 pages.
Corrected Notice of Allowability for U.S. Appl. No. 16/229,268, dated Dec. 16, 2019, 7 pages.
Non-Final Office Action for U.S. Appl. No. 16/829,863, dated Mar. 10, 2021, 17 pages.
Notice of Allowance for U.S. Appl. No. 16/829,863, dated Jun. 4, 2021, 9 pages.
Non-Final Office Action for U.S. Appl. No. 14/390,649, dated Jul. 15, 2016, 21 pages.
Final Office Action for U.S. Appl. No. 14/390,649, dated Dec. 16, 2016, 8 pages.
Advisory Action and Examiner-Initiated Interview Summary for U.S. Appl. No. 14/390,649, dated Apr. 10, 2017, 4 pages.
Non-Final Office Action for U.S. Appl. No. 14/390,649, dated Jul. 26, 2017, 22 pages.
Notice of Allowance for U.S. Appl. No. 14/390,649, dated Feb. 8, 2018, 7 pages.
Notice of Allowance for U.S. Appl. No. 14/390,649, dated May 18, 2018, 8 pages.
Non-Final Office Action for U.S. Appl. No. 16/104,552, dated Nov. 1, 2018, 22 pages.
Final Office Action for U.S. Appl. No. 16/104,552, dated Jul. 23, 2019, 16 pages.
Advisory Action and Examiner-Initiated Interview Summary for U.S. Appl. No. 16/104,552, dated Oct. 25, 2019, 7 pages.
Non-Final Office Action for U.S. Appl. No. 16/104,552, dated Dec. 20, 2019, 15 pages.
Notice of Allowance for U.S. Appl. No. 16/104,552, dated Apr. 15, 2020, 8 pages.
Non-Final Office Action for U.S. Appl. No. 15/134,861, dated Apr. 11, 2018, 6 pages.
Notice of Allowance for U.S. Appl. No. 15/134,861, dated Jul. 13, 2018, 9 pages.
Extended European Search Report for European Patent Application No. 17164602.9, dated Jul. 25, 2017, 9 pages.
Extended European Search Report for European Patent Application No. 19153143.3, dated May 20, 2019, 8 pages.
Extended European Search Report for European Patent Application No. 21157093.2, dated Jun. 4, 2021, 6 pages.
International Search Report and Written Opinion for International Patent Application No. PCT/SE2013/051335, dated Feb. 12, 2014, 10 pages.
Examination Report for European Patent Application No. 13802130.8, dated Apr. 11, 2019, 4 pages.
Substantive Examination for Russian Patent Application No. 2015122640/07, dated May 5, 2016, 12 pages.
International Search Report for International Patent Application No. PCT/SE2013/051334, dated Apr. 24, 2014, 3 pages.
The First Office Action for Chinese Patent Application No. 201680024790.4, dated Aug. 3, 2018, 29 pages.
International Search Report and Written Opinion for International Patent Application No. PCT/EP2016/059218, dated Jul. 18, 2016, 15 pages.

\* cited by examiner

Figure 2 Method performed by the transmitting node, e.g. by the wireless device 108 or the network, such as network node 104 and/or RNN 106

Figure 4 Method performed by the receiving node, such as the network, e.g. network node 104 and/or RNN 106, or wireless device 108

Figure 11 Method performed by a RNN 106

Figure 12 Method performed by a wireless device 108

| TDMA frame number | Timeslot number | | | | | | | |
|---|---|---|---|---|---|---|---|---|
| | 0 | 1 | 2 | 3 | 4 | 5 | 6 | 7 |
| N | | | B1 | B1 | B1 | B1 | | |
| N+1 | | | B2 | B2 | B2 | B2 | | |
| N+2 | | | B3 | B3 | B3 | B3 | | |
| N+3 | | | B4 | B4 | B4 | B4 | | |

Figure 13

RADIO NETWORK NODE AND A WIRELESS DEVICE, AND METHODS THEREIN

TECHNICAL FIELD

Embodiments herein relate to a Radio Network Node (RNN), a wireless device, and to methods therein. Especially, embodiments herein relate to providing improved robustness of a radio link between the RNN and the wireless device operating in a communications network.

BACKGROUND

In the field of wireless communication, communication devices such as terminals or wireless devices are also known as e.g. User Equipments (UE), stations (STAs), mobile terminals, wireless terminals and/or Mobile Stations (MS). Such terminals are enabled to communicate wirelessly in a wireless communication system, such as a Wireless Local Area Network (WLAN), or a cellular communications network, sometimes also referred to as a cellular radio system or cellular networks. The communication may be performed e.g. between two terminals, between a terminal and a regular telephone, between a terminal and an Access Point (AP), and/or between a terminal and a server via a Access Network (AN) and possibly one or more core networks, comprised within the communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the AN, such as a Radio Access Network (RAN), with another entity, such as another terminal or a server.

The communications network covers a geographical area which is divided into geographical subareas, such as coverage areas, cells or clusters.

In a WLAN, such a geographical subarea, is defined by one network node, e.g. one Access Point (AP), and one or more communications devices, e.g. STAs, which network node and one or more communications devices sometimes also are referred to as a Basic Service Set (BSS).

In a cellular communications network each cell area is served by an access node such as a base station, e.g. a Radio Base Station (RBS), which sometimes may be referred to as e.g. "eNB", "eNodeB", "Node B", "B node", Base Station (BS) or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used to denote the transmission path from the base station to the mobile station. The expression Uplink (UL) is used to denote the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks. 3GPP LTE radio access standard has been written in order to support high bitrates and low latency both for uplink and downlink traffic. All data transmission is in LTE typically controlled by the radio base station.

In 3rd Generation Partnership Project (3GPP) GSM EDGE Radio Access Network (GERAN) solution, base stations, which may be referred to as Base Transceiver Stations, may be connected to a Base Station Controller (BSC). The BSC may be connected to one or more core networks.

The anticipated ubiquitous deployment of wireless devices used for Machine Type Communication (MTC) is expected to result in wireless devices being placed outside the existing radio coverage of the existing radio networks, e.g. in basements and similar. One way to improve the radio coverage is by expanding the RAN infrastructure, e.g. by adding additional RBS equipment. However, this may very quickly result in unreasonable investment effort and will not be acceptable to Mobile Network Operators (MNOs).

An alternative approach is to keep the existing radio access networks infrastructure unchanged but instead improve the radio coverage through novel radio transmission and reception techniques as well as new Radio Resource Management algorithms. The latter approach is currently discussed in the wireless industry and a subject for standardization effort e.g. in 3GPP, see for example EC-GSM in TR 45.820 V13.1.0.

SUMMARY

An object of embodiments herein is to improve radio coverage to cater for wireless devices, such as MTC devices, requiring ubiquitous connectivity among others and to improve the performance in a communications network.

According to a first aspect of embodiments herein, the object is achieved by a method performed by a transmitting node, e.g. a Radio Network Node (RNN), for providing improved robustness for communication in a communications network.

Especially, embodiments provide for improved robustness of a radio link between the transmitting node, e.g. the RNN, and a receiving node, e.g. a wireless device. The radio link may be able to operate in different transmission modes, wherein the transmission modes reach different levels of coverage extension. The transmitting node, e.g. the RNN, and the receiving node, e.g. the wireless device, are operating in the communications network.

The transmitting node, e.g. the RNN, transmits, towards the receiving node, e.g. the wireless device, a transmission with a first transmission mode associated with a first level of coverage extension, e.g. with a first Coverage Class (CC). In the following a certain CC may be associated with a predetermined number of transmissions to support extended coverage. The transmission(s) may be sent blindly, without feedback from the receiving end. To maximize the processing gain at the receiver, phase coherency at the transmitter, between transmission, may be required. A higher CC may use a higher number of transmissions to improve robustness of the radio link to increase coverage further.

The transmitting node, e.g. the RNN, may determine whether the transmitted transmission reached the receiving node, e.g. the wireless device.

When the transmitted transmission has not reached the receiving node, e.g. the wireless device, the transmitting node, e.g. the RNN, transmits, towards the receiving node, the transmission using a second transmission mode associated with a second level of coverage extension, e.g. a second CC. Alternatively, the transmitting node, e.g. the RNN, may perform a pre-emptive transmission using the second transmission mode when a first period of time has elapsed. Thus, when the first period of time has elapsed, the RNN transmits, towards the wireless device, the transmission using the second transmission mode associated with the second level of coverage extension. The second level of coverage extension may be higher than the first level of coverage extension meaning that the second level of coverage extension may be able to operate in a more extreme coverage than the first level of coverage extension. By the expression "extreme coverage" when used in this disclosure is meant that the radio coverage is worse than a normal radio coverage due to e.g. a higher path loss or a higher interference level than in the normal radio coverage. In the following a transmission mode is associated with a certain radio coverage extension, and possibly coupled with a distinct CC.

According to a second aspect of embodiments herein, the object is achieved by a transmitting node, e.g. an RNN, for providing improved robustness for communication in a communications network.

Especially, embodiments provide for improved robustness of a radio link between the transmitting node, e.g. the RNN, and a receiving node, e.g. a wireless device. The radio link may be able to operate in different transmission modes, wherein the transmission modes reach different levels of coverage extension. The transmitting node, e.g. the RNN, and the receiving node, e.g. the wireless device, are operable in the communications network.

The transmitting node, e.g. the RNN, is configured to transmit, towards the receiving node, e.g. the wireless device, a transmission with a first transmission mode associated with a first level of coverage extension, e.g. with a first CC.

The transmitting node, e.g. the RNN, may be configured to determine whether the transmitted transmission reached the receiving node.

When the transmitted transmission has not reached the receiving node, e.g. the wireless device, the transmitting node, e.g. the RNN, is configured to transmit the transmission using a second transmission mode associated with a second level of coverage extension, e.g. a second CC. Alternatively, the transmitting node, e.g. the RNN, may be configured to perform a pre-emptive transmission using the second transmission mode when a first period of time has elapsed. Thus, the RNN is configured to transmit, towards the wireless device, the transmission using the second transmission mode associated with the second level of coverage extension when the first period of time has elapsed.

According to a third aspect of embodiments herein, the object is achieved by a method performed by a receiving node, e.g. a wireless device, for providing improved robustness for communication in a communications network. Especially, embodiments provide for improved robustness of a radio link between a transmitting node, e.g. an RNN, and the receiving node, e.g. the wireless device. The radio link may be able to operate in different transmission modes, wherein the transmission modes reach different levels of coverage extension. The transmitting node, e.g. the RNN, and the receiving node, e.g. the wireless device, are operating in the communications network.

The receiving node, e.g. the wireless device, assumes that a received transmission, e.g. a received block, has been transmitted with a first transmission mode associated with a first level of coverage extension, e.g. a first CC.

The receiving node, e.g. the wireless device, determines whether or not the received transmission may be decoded with the assumed first level of coverage extension. In other words, the receiving node, e.g. the wireless device, determines whether or not the received transmission is decodable with the assumed first level of coverage extension.

When the received transmission cannot be decoded with the assumed first transmission mode associated with the first level of coverage extension within a first period of time, the receiving node, e.g. the wireless device, assumes that the transmission has been transmitted with a second transmission mode associated with a second level of coverage extension, e.g. a second CC, and tries to decode the received transmission with the assumed second transmission mode. The second level of coverage extension is higher than the first level of coverage extension.

According to a fourth aspect of embodiments herein, the object is achieved by a receiving node, e.g. a wireless device, for providing improved robustness for communication in a communications network. Especially, embodiments provide for improved robustness of a radio link between a transmitting node, e.g. an RNN, and the receiving node, e.g. the wireless device. The radio link may be able to operate in different transmission modes, wherein the transmission modes reach different levels of coverage extension. The transmitting node, e.g. the RNN, and the receiving node, e.g. the wireless device, are operable in the communications network.

The receiving node, e.g. the wireless device, is configured to assume that a received transmission, e.g. a received block, has been transmitted with a first transmission mode associated with a first level of coverage extension, e.g. a first CC.

The receiving node, e.g. the wireless device, is configured to determine whether or not the received transmission may be decoded with the assumed first level of coverage extension. In other words, the receiving node, e.g. the wireless device, is configured to determine whether or not the received transmission is decodable with the assumed first level of coverage extension.

When the received transmission cannot be decoded with the assumed first transmission mode associated with the first level of coverage extension within a first period of time, the receiving node, e.g. the wireless device, is configured to assume the transmission has been transmitted with a second transmission mode associated with a second level of coverage extension, e.g. a second CC, and configured to try to decode the received transmission with the assumed second transmission mode. The second level of coverage extension is higher than the first level of coverage extension.

According to a fifth aspect of embodiments herein, the object is achieved by a computer program, comprising instructions which, when executed on at least one processor, causes the at least one processor to carry out the method performed by the transmitting node, e.g. the RNN.

According to a sixth aspect of embodiments herein, the object is achieved by a computer program, comprising instructions which, when executed on at least one processor, causes the at least one processor to carry out the method performed by the receiving node, e.g. the wireless device.

According to a seventh aspect of embodiments herein, the object is achieved by a carrier comprising the computer program, wherein the carrier is one of an electronic signal, an optical signal, a radio signal or a computer readable storage medium.

An advantage with embodiments herein is that they improve the robustness of control signaling in the communications network, to improve the likelihood of e.g. assignment messages to be decoded by a receiver, e.g. by a receiving node, e.g. the wireless device. As a consequence the number of so called silent fixed allocations may be reduced.

Herein, the term "fixed allocation" refers to an assignment of a certain number of radio resources to a certain transmitter, e.g. a certain transmitting node, e.g. the RNN. If e.g. a wireless device is able to decode a received assignment message sent in the DL containing a for the wireless device Fixed Uplink Allocation (FUA), the wireless device will as a consequence utilize those allocated UL radio resources specified by the FUA for transmission. However, if the wireless device fails to decode the assignment message, i.e. the FUA, due to an insufficiently robust radio link it will as a result not transmit, i.e. remain silent, during the fixed allocation. Those resources would thus not be utilized. Further, embodiments herein will also reduce the number resources used for transmission of ACK/NACK-reports and/or assignment messages that would have a high risk of being unsuccessfully decoded. This will reduce the interference caused by transmission of ACK/NACK-reports and/or assignment messages and help to conserve battery in the wireless device.

Another advantage of embodiments disclosed herein is that the number of unsuccessful connections, e.g. uplink Temporary Block Flows (TBFs), will be decreased since fewer, connections, e.g. uplink TBFs, will be lost due to unsuccessful reception of the ACK/NACK and/or assignment messages. Since such an unsuccessful connection may lead to devices needing to restart packet connection establishment procedures via the common control channel, the load on the common control channel would thus be decreased. The power consumption in the device would then also be decreased.

Yet another advantage of embodiments disclosed herein is that they will increase the probability of successful reception of paging messages and/or control messages sent on the common control channel.

BRIEF DESCRIPTION OF DRAWINGS

Examples of embodiments herein will be described in more detail with reference to attached drawings in which:

FIG. 13 is a diagram that illustrates exemplary blind transmissions on EC-PACCH in some embodiments.

DETAILED DESCRIPTION

Figure 1:
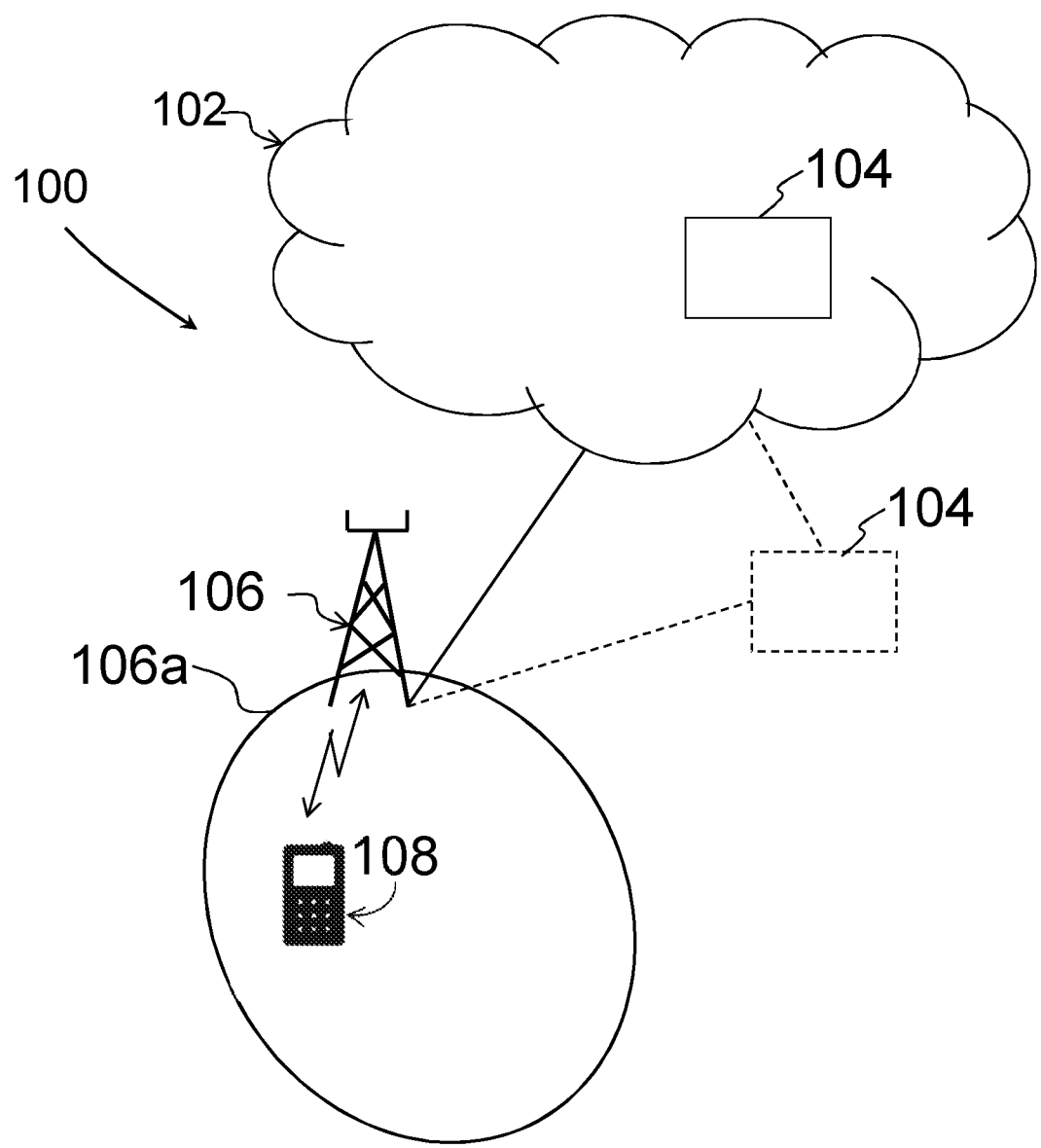
FIG. 1 schematically illustrates an embodiment of a communications network.

As part of developing embodiments herein, some problems with the state of the art communications systems will first be identified and discussed.

Before there is any communication between a communications network, e.g. a network node and/or a Radio Network Node (RNN), and a wireless device capable of operating in extended coverage, the wireless device typically assesses the radio environment and chooses a transmission mode for its operation; this transmission mode is usually referred to as a Coverage Class (CC) or coverage level.

By the expression "a wireless device capable of operating in extended coverage" when used in the disclosure is meant that the wireless device is able to communicate with the network node and/or the RNN in a radio coverage range exceeding a radio coverage range supported by a 3GPP cellular network, such as a legacy GSM system. The coverage extension may be achieved e.g. by using an extended number of repetitions of a transmission as compared to the number of repetitions of the transmission used for a wireless device capable of operating in normal coverage. The Coverage Class or coverage level may define the number of repetitions to be used for a transmission in order to obtain an extension of the coverage range within which range the transmission may be received by a receiving node.

In the following a certain CC may be associated with a predetermined number of repetitions to support extended coverage. The repetitions may be sent blindly, without feedback from the receiving end. To maximize the processing gain at the receiver, phase coherency at the transmitter, between repetitions, may be required. A higher CC may use a higher number of repetitions to improve robustness of the radio link to increase coverage further.

However, when operating in extended coverage the estimation of the coverage class required for the wireless device to communicate with the network, e.g. the RNN, may be difficult to assess for the wireless device, since the wireless device is operating at a low signal level, possibly even weaker than the thermal noise in the wireless device.

On top of that, the wireless device may be a mobile wireless device, in which case the radio environment may change significantly over time. However, due to a requirement on long battery lifetime it may not be possible for the wireless device to frequently measure its surrounding radio environment.

These effects give rise to the wireless device possibly being in the sub-optimal coverage class when communicating with the network, e.g. the RNN, possibly resulting in a high block error rate on the channel used for communication, and an inefficient, or in worst case lost, communication link.

In a first example, the operation in a legacy GSM system is compared with an extended coverage operation of an Enhanced Coverage Enhanced GPRS (EC-EGPRS) system. It should be understood that EC-EGPRS sometimes is referred to as Extended Coverage GSM Internet of Things (EC-GSM-IoT), and thus a reference to EC-EGPRS should be considered as a reference to EC-GSM-IoT. In the legacy GSM system, the control channels are designed to operate at a maximum coupling loss of the communications system, and all wireless devices use the same way of transmitting control messages. That is, the same level of robustness is applied by the transmitting endpoint when a control message is sent regardless of the actual radio environment experienced by the respective wireless device. By the expression to "operate at maximum coupling loss" when used herein is meant that the radio link is operating at its maximal coverage range. A wireless device at the edge, e.g. at the edge of the coverage, of the wireless system may be said to operate at the maximum coupling loss of the system. When considering the case of EC-EGPRS, only a small portion of the wireless devices are expected to be in extended coverage, and hence dimensioning all control signaling for the worst coverage range, e.g. the maximum coupling loss for the extended coverage operation, is a significant waste of resources. In the EC-EGPRS design (see 3GPP TR 45.820, where the technology is referred to as EC-GSM), the Extended Coverage Common Control Channel (EC-CCCH) makes use of 64 bursts in an extreme coverage, compared to 2 bursts in normal coverage, i.e. a factor of 32 times more resources are needed to convey a certain amount of information. As such, EC-EGPRS supports the approach of targeting the level of control message robustness according to the coverage class of the wireless device with which communication is intended.

In a second example, the potential problems with a Fixed Uplink Allocation (FUA) based uplink data transmission for EC-EGPRS is analyzed. When using the FUA the communications network, e.g. the RNN, transmits a downlink assignment message to the wireless device, which assignment message assigns the uplink radio resources the wireless device is to use for its data transmission. In some cases, the assignment message may possibly comprise an ACK/NACK report, e.g. reporting to the wireless device the data blocks that are Acknowledged, i.e. received OK, or Negatively Acknowledged, i.e. not received OK, if the wireless device has previously received an assignment message and transmitted uplink data accordingly. The assignment message may therefore possibly assign resources for both retransmission of NACKed data blocks and new data blocks. The assignment message may be transmitted from the controlling node, e.g. a Base Station Controller (BSC), in the network to the transmitting node, e.g. the RNN, such as a BTS, that further transmits it to the wireless device.

In the FUA operation, the following problems may occur when the wireless device has finished transmitting according to the last received assignment message and is therefore expecting an ACK/NACK report:

If the assignment message comprising the ACK/NACK-report is lost one or more of the following may happen:

The wireless device will not know that it is expected to retransmit some NACKed data blocks.

The wireless device will not know when it is expected to transmit new data blocks.

The loss of the assignment message results in what is referred to as a "silent" Fixed Uplink Allocation (silent FUA), where the network, e.g. the network node and/or the RNN, expects a wireless device to transmit on the assigned resources but due to the lost assignment message, the wireless device will not transmit, and hence the resources are unused.

The wireless device May oily transmit data blocks if it may deduce which data blocks the network, e.g. the network node and/or the RNN, is expecting. Otherwise, it may not transmit any data blocks at this time.

The network, e.g. the network node and/or the RNN, will not be able to receive retransmitted data in the allocation for retransmission, since the wireless device has not sent them.

Upon detecting a first silent FUA, the network, e.g. the network node, e.g. a controlling node such as the BSC, will send a second, assignment message. The controlling node may send the second assignment node to a transmitting node, e.g. the RNN, which may send it to a receiving node, e.g. the wireless device. There is a risk that the second assignment message also will be lost, which will lead to a second silent FUA. This risk is obviously higher if the first assignment message could not be successfully received due to that the level of coverage extension used for the transmission was not sufficient, and the same level is used for the second message. Hence, losing assignment messages may result in a significant number of silent FUAs and a lot of resources for transmission of data units being unused. It may also lead to a lot of assignment messages and therefore a lot of radio resources for transmission of control messages being used.

The uplink data transmission transfer may be abnormally terminated by both the network and the wireless device when a silent FUA occurs. This may also be described as the Temporary Block Flow (TBF) being abnormally released. In order to finish the transfer after an abnormal release a new TBF must be setup with all the control signaling associated with that new setup. Since the resources available to set up new TBFs are generally scarce the relative number of resources required for the transfer will be high and the device will experience additional battery drain.

It should be noted that in case of a downlink data transmission and the corresponding ACK/NACK report on the uplink, the network, e.g. the RNN or a network node such as the controlling node, e.g. the BSC, faces the same sort of problem. In this disclosure, the term "network" is used generic and may refer to a BTS and/or a BSC for GSM, to an eNB for LTE, and to a NodeB (NB) and a Radio Network Controller (RNC) for UMTS. If the network does not receive an ACK/NACK report that negatively acknowledges blocks, the network will not know what downlink data blocks need to be retransmitted. In order to poll the wireless device for another ACK/NACK report, the network may then have to retransmit a data block which has already been received by the wireless device. In case that e.g. a worsened radio condition in the uplink direction remains, the wireless device may be successfully polled on the downlink but several corresponding ACK/NACK reports may be lost, which then eventually may lead to an abnormal release of the downlink (DL) TBF. Just as for the Fixed Uplink Allocation case described above, a new DL TBF will then need to be set up, using additional control signaling and consuming additional battery, in order to finish the transfer.

The same issue appears when a worsened radio condition is experienced in the downlink direction during the downlink data transmission. This may thus lead to that the wireless device does not successfully receive any data blocks, even though transmitted by the network, e.g. the network and/or the RNN. If the worsened radio condition remains, the wireless device would then not be able to receive any downlink data block being transmitted by the network, e.g. the network and/or the RNN. This would be the case independently of whether the wireless device manages to read poll information in a downlink header of any of the data blocks and transmit an ACK/NACK message accordingly or if the wireless device cannot read any poll information and thus would not transmit any ACK/NACK message. In either case, it may eventually lead to an abnormal release of the DL TBF and a new DL TBF would then need to be set up, using additional control signaling and consuming additional battery, in order to finish the transfer.

Therefore, embodiments herein relate to providing an increased system robustness in a communications network when operating in extended coverage, while still minimizing resources used to do so.

Terminology

The following terminology is used in embodiments described herein and is elaborated below:

Radio Network Node (RNN): In some embodiments the non-limiting term radio network node is more commonly used and it refers to any type of network node serving UE and/or connected to other network node or network element or any radio node from where UE receives signal. Examples of radio network nodes are NodeB, base station (BS), Base Transceiver Station (BTS), multi-standard radio (MSR) radio node such as MSR BS, eNodeB (eNB), network controller, radio network controller (RNC), Base Station Controller (BSC), relay, donor node controlling relay, Access Point (AP), transmission points, transmission nodes, RRU, RRH, nodes in distributed antenna system (DAS) etc.

Network node: In some embodiments a more general term "network node" is used and it may correspond to any type of network node or radio network node, which communicates with a communications device, a wireless device, a UE, and/or with another network node. Examples of network nodes are Access Point (AP), Access Node, Node B, MeNB, SeNB, a network node belonging to a Master Cell Group (MCG) or a Secondary Cell Group (SCG), Base Station (BS), Base Transceiver Station (BTS), Multi-Standard Radio (MSR) radio node such as MSR BS, eNodeB, network controller, radio Network Controller (RNC), Base Station Controller (BSC), relay, donor node controlling relay, Access Point (AP), transmission points, transmission nodes, Remote Radio Unit (RRU), Remote Radio Head (RRH), nodes in Distributed Antenna System (DAS), core network, node (e.g. Mobile Switching Centre (MSC), Mobility Management Entity (MME), Serving GPRS Support Node (SGSN), Gateway GPRS Support Node (GGSN) etc), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

Communications device/User equipment/wireless device: In some embodiments the non-limiting terms communications device, wireless device, Mobile Station (MS) and User Equipment (UE) are used and they refer to any type of wireless device communicating with a network node, a radio network node or with another UE in a communication system. Examples of communications device/UE/wireless device are Device-to-Device (D2D) UE, machine type UE or UE capable of machine to machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles etc. In this disclosure the terms communications device, wireless device, Mobile Station (MS) and UE are used interchangeably. It should be noted that the term user equipment used in this document also covers other communications devices such as Machine to Machine (M2M) devices or Internet of Things devices, even though they are not handled by any user.

In the following section, embodiments herein will be illustrated in more detail by various exemplary embodiments. It should be noted that these embodiments are not mutually exclusive. Components from one embodiment may be assumed to be present in another embodiment and it will be obvious to a person skilled in the art how those components may be used in the other exemplary embodiments.

As mentioned above, some embodiments disclosed herein relates to the improvement of system robustness when operating a communications network, e.g. a wireless network, capable of extended coverage, while minimizing system resources to do so.

In embodiments disclosed herein, a transmitting node and a receiving node are provided to improve the robustness of a radio link, wherein the radio link is able to operate in different transmission modes. The transmission modes reach different levels of coverage extension. The expressions "Coverage extension" and "Extended Coverage (EC)" when used in this disclosure refers to enabled operation in higher (relative) levels of interference and/or noise as compared to normal coverage wherein the levels of e.g. interference and/or noise are the ones supported by a 3GPP system, such as e.g. a legacy GSM system. A specific transmission mode may for example imply a specific number of blind physical layer transmissions by the transmitting node to reach a certain level of coverage extension compared to not using blind physical layer transmissions. The term blind physical layer transmissions is also defined in 3GPP TS 43.064 V13.0.0. The different transmission modes are usually referred to as Coverage Classes (CC) or Coverage Levels. In this disclosure, the term Coverage Class is used but should be considered equivalent to the term Coverage Level.

The transmitting node may be a wireless device and the receiving node may be a network node and/or a Radio Network Node (RNN). However, the transmitting node may be the network node and/or the RNN, and the receiving node may be the wireless device. Further, it should be understood that each of the wireless device, the network node and the RNN may be considered as a transmitting and receiving node.

It is proposed to explicitly or implicitly notify the receiving node and/or the transmitting node that a second transmission opportunity and/or a second reception opportunity may occur in the future, in the event that the first opportunity is lost or considered as lost. The second opportunity may happen at a point in time immediately following the first opportunity, at a specified point in time, or based on a predefined rule or event. It should be understood that the transmitting node may perform the second transmission without a notification to the transmitting node. Thus, the transmitting node may transmit the second time without determining if the first transmission was received or not. In other words, the transmitting node may transmit the second transmission when a first period of time has elapsed. The receiving node may however determine that it has not received the first transmission. Further, the second transmission may be transmitted with a higher level of coverage extension, e.g. CC.

FIG. 1 depicts an example of a communications network 100 in which embodiments herein may be implemented. The communications network 100 may be a wireless communications network. Further, the communications network 100 may be an UMTS network, an LTE network, a WCDMA network, a GSM network, any 3GPP cellular network, WiMAX network, any communications network configured to support a packet oriented mobile data service such as General Packet Radio Service (GPRS), or a combination of one or more of the aforementioned communications networks. Some embodiments herein relates to a communication network configured to support Extended Coverage (EC). By the expression "Extended Coverage (EC)" when used in this disclosure is meant to support operation at a path loss, or radio coverage range, exceeding the coverage range earlier supported by 3GPP cellular networks, such as e.g. a legacy GSM system.

The communications network 100 comprises a core network 102. The core network 202 may be an UMTS core network, a LTE core network, a WCDMA core network, an GSM core network, a GPRS core network, any 3GPP cellular core network, a WiMAX core network, or a core network of any other wireless communication network or system. The core network 102 may be configured to support EC.

A network node 104 is comprised in the communications network 100. The network node 104 is configured to operate in the communications network 100. In other words, the network node 104 is operable in the communications network 100. The network node 104 may be a core network node operable in the core network 104. In some embodiments, the network node 104 is arranged external of the core network 102. The network node 104 may be configured to support EC.

A Radio Network Node (RNN) 106 is comprised in the communications network 100. The RNN 106 is configured to operate in the communications network 100. In other words, the RNN 106 is operable in the communications network 100. The RNN 106 is arranged in communication with the core network 102. In some embodiments, the RNN 106 is arranged in communication with the network node 104.

The RNN 106 is configured to serve a geographical area 106a. The geographical area 106a may be determined as the area where radio communication between the RNN 106 and a wireless device 108 is possible. In this disclosure, the geographical area 106a is sometimes also referred to as a coverage area, a cell or a cluster. The RNN 106 may be configured to support EC.

A wireless device 108 operates in the communications network 100. As mentioned above, the wireless device 108 may e.g. be a user equipment, a mobile terminal, a mobile station (MS) or a wireless terminal, a mobile phone, a computer such as e.g. a laptop, a Personal Digital Assistant (PDA) or a tablet computer, sometimes referred to as a tablet, with wireless capability, or any other radio network units capable to communicate over a radio link in the communications network 100. Please note the term user equipment used in this document also covers other wireless devices such as Machine to Machine (M2M) devices and Internet of Things (IoT) devices, even though they do not have any user. The wireless device 108 may be configured to support EC, and is therefore sometimes in this disclosure referred to as an EC wireless device.

Figure 2:
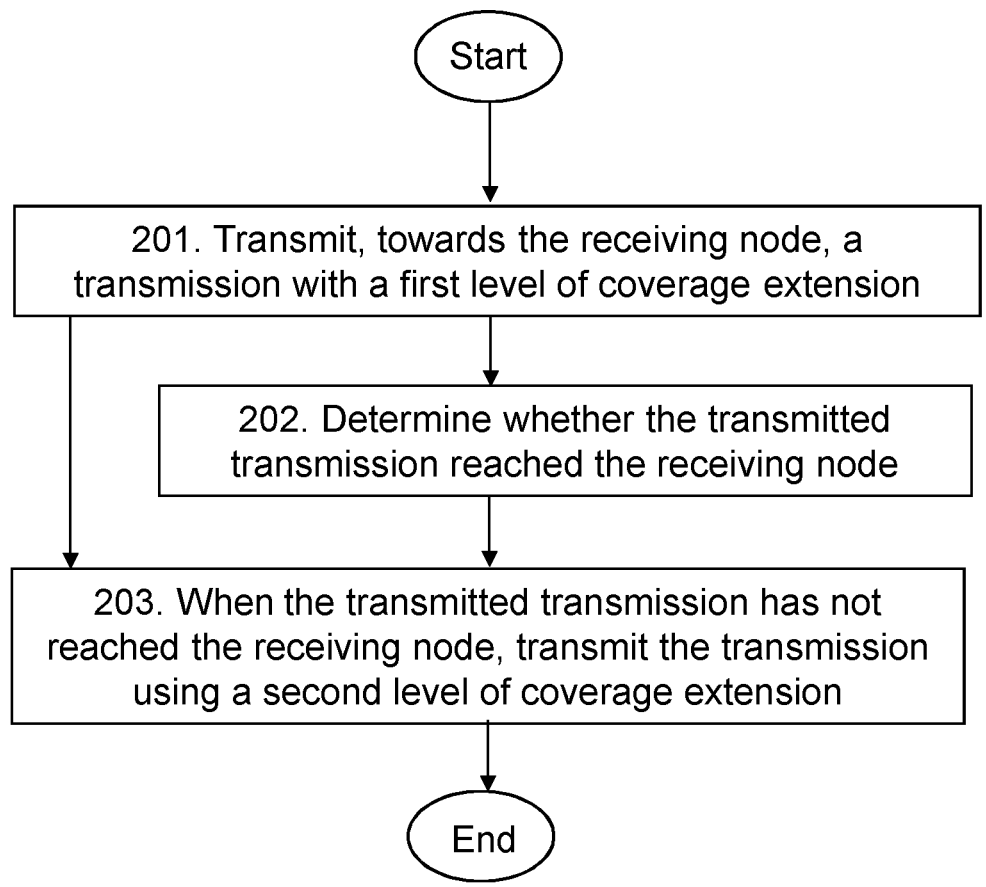
FIG. 2 is a flowchart depicting embodiments of a method performed by a transmitting node.

FIG. 2 schematically illustrates embodiments of a method performed by a transmitting node for providing improved robustness for communication in the communications network 100. Especially, embodiments provide for improved robustness of a radio link between the transmitting node and a receiving node. The radio link may be able to operate in different transmission modes, wherein the transmission modes reach different levels of coverage extension. The transmitting node and the receiving node are operating in the communications network 100. Both the transmitting node and the receiving node may be a wireless device, such as the wireless device 108, or a network node 104 or an RNN 106. Further, when the transmitting node is the wireless device 108, the receiving node is the network node 104 and/or the RNN 106, and vice versa. One or more of the Actions below may be combined and/or performed in another suitable order. Further, one or more actions may be optional.

In Action 201 the transmitting node transmits, towards the receiving node, a transmission with a first transmission mode associated with a first level of coverage extension, e.g. with a first CC.

In Action 202 the transmitting node determines whether the transmitted transmission reached the receiving node.

In Action 203, when the transmitted transmission has not reached the receiving node, the transmitting node transmits, e.g. retransmits, the transmission using a second transmission mode associated with a second level of coverage extension, e.g. a second CC. The second level of coverage extension is higher than the first level of coverage extension meaning that the second level of coverage extension is able to operate in a more extreme coverage than the first level of coverage extension. The more extreme coverage may be due to higher path loss, but may also be associated with higher interference levels etc.

If it is determined that the transmission transmitted with the second level of coverage extension has not reached the receiving node, the transmission may be retransmitted using one or more other transmission modes associated with one or more higher levels of coverage extension until the transmission is determined to have reach, the receiving node or until a maximum level of coverage extension has been reached. Thus, the Actions 202 and 203 may be repeated several times.

In some embodiments, the transmitting node may transmit, e.g. retransmit, the transmission using a second transmission mode associated with a second level of coverage extension, e.g. a second CC, without determining if the transmitted transmission has reached the receiving node. This will be described in more detail below with reference to e.g. Action 1104. In such embodiments, the Action 202 described above is not performed. In other words and as previously mentioned, the transmitting node may transmit the transmission using the second transmission mode when a first period of time has elapsed and without determining whether or not the first transmission was received by the receiving node.

As previously mentioned, the transmitting node may be the RNN 106 and the receiving node may be the wireless device 108. This is for example the case in FIG. 11 which is to be described below.

Figure 11:
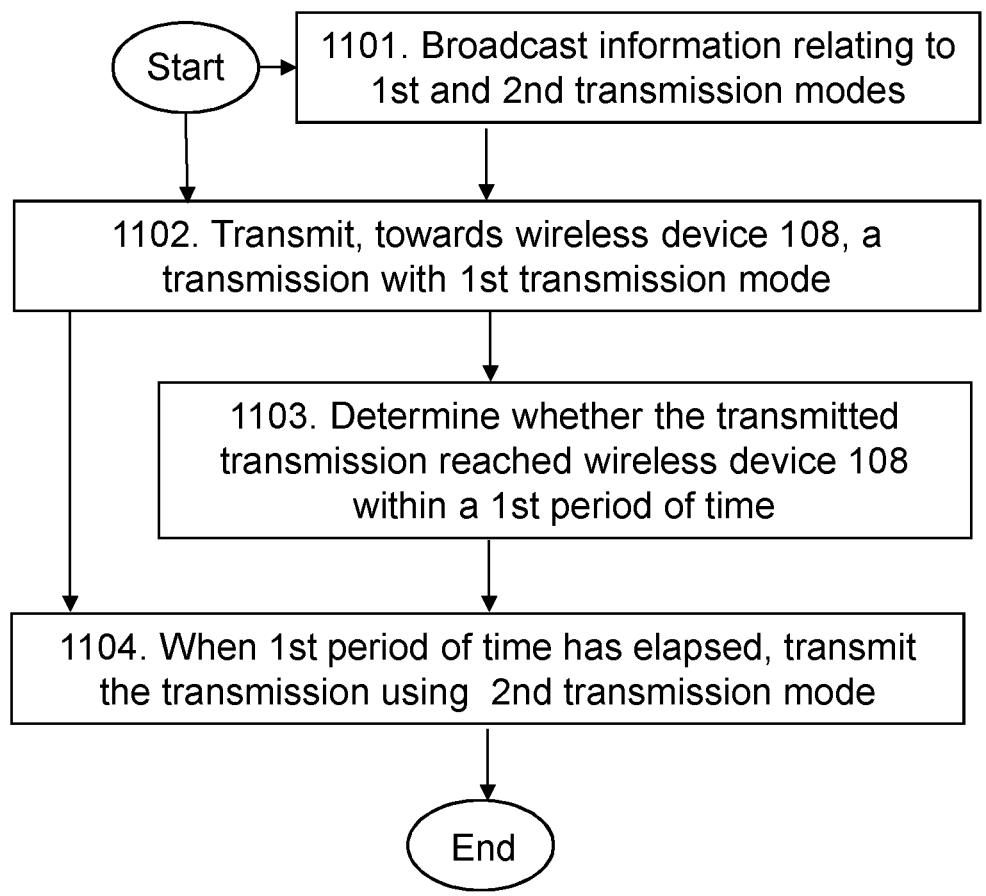
FIG. 11 is a flowchart depicting embodiments of a method performed by a RNN.

FIG. 11 schematically illustrates embodiments of a method performed by the RNN 106 for providing improved robustness of a radio link between the RNN 106 and the wireless device 108. Thus, the method is performed by the RNN 106 for providing improved robustness for communication in the communications network 100. The embodiments of the method described in relation to FIG. 11 relate to some second embodiments as will described below. Further, the appended claims also relate to the some second embodiments described below. As previously mentioned, the RNN 106 and the wireless device 108 operate in a communications network 100. One or more of the Actions below may be combined and/or performed in another suitable order. Further, one or more actions may be optional.

Action 1101

In some embodiments, the RNN 106 broadcasts information relating to a first transmission mode and a second transmission mode. This may be done by the RNN 106 in order to inform the wireless device 108 about possible transmissions modes, e.g. about the first and second transmissions modes, that the RNN 106 may use for transmissions to the wireless device 108. For example, information relating to a first period of time during which first period of time the first transmission mode is used and information relating to a second period of time during which second period of time the second transmission mode is used may be broadcasted.

The first transmission mode is associated with a first level of coverage extension. The first level of coverage extensions may be a first coverage class. In some embodiments, the first coverage class is associated with a first number of repetitions of the transmission.

The second transmission mode is associated with a second level of coverage extension. The second level of coverage extension may be a second coverage class. In some embodiments, the second coverage class is associated with a second number of repetitions of the transmission. Further, in some embodiments, the second number of repetitions is larger than the first number of repetitions associated with the first coverage class. Thereby, an extended coverage range is provided for transmissions transmitted using the second transmission mode as compared to transmissions transmitted using the first transmission mode.

Action 1102

The RNN 106 transmits, towards the wireless device 108, a transmission with the first transmission mode associated with the first level of coverage extension. Thus, the RNN 106 transmits the transmission in a direction to the wireless device 108. However, the transmission may or may not reach the wireless device 108.

In some embodiments, the RNN 106 transmits the transmission with the first transmission mode using an Extended Coverage Access Grant Channel (EC-AGCH), an Extended Coverage Packet Data Traffic Channel (EC-PDTCH), or an Extended Coverage Packet Access Control Channel (EC-PACCH).

This relates to Action 201 previously described.

Action 1103

In some embodiments, the RNN 106 determines whether or not the transmitted transmission reached the wireless device 108 within the first period of time.

The RNN 106 may determine whether or not the transmitted transmission reached the wireless device 108 within the first period of time by performing one or more out of:

determine whether or not an acknowledgement, ACK, report or a negative acknowledgement, NACK, report received from the wireless device 108 indicates whether or not the transmitted transmission was received by the wireless device 108;

determine whether or not a measuring report received from the wireless device 108 indicates that a received signal strength and/or a received radio quality of the transmitted transmission is below a threshold;

determine whether or not a downlink coverage class estimation received from the wireless device 108 indicates that the second transmission mode is to be used for transmission; and determine whether or not a message is transmitted from the wireless device 108 in resources allocated in the transmitted transmission. The message may be a data message or a control message.

This relates to Action 202 previously described.

Action 1104

When a first period of time has elapsed, the RNN 106 transmits, towards the wireless device 108, the transmission using the second transmission mode associated with the second level of coverage extension, wherein the second level of coverage extension is higher than the first level of coverage extension.

This relates to Action 203 previously described. Thus, when the first period of time has elapsed, and when the RNN 106 may have assumed that the transmitted transmission has not reached the wireless device 108, the RNN 106 retransmits the transmission using the second transmission mode providing a higher level of coverage extension. Thereby, the probability that the transmission reaches the wireless device 108 is higher as compared to the case when the transmission was transmitted using the first transmission mode associated with the first level of coverage extension.

In some embodiments as described in relation to Action 1103 above, the RNN 106 transmits the transmission using the second transmission mode associated with the second level of coverage extension, when the transmitted transmission is determined to not have reached the wireless device 108 within the first period of time.

In some embodiments, when a second period of time has elapsed, the RNN 106 transmits, towards the wireless device 108, the transmission using a third transmission mode associated with a third level of coverage extension, wherein the third level of coverage extension is higher than the second level of coverage extension.

Figure 3:
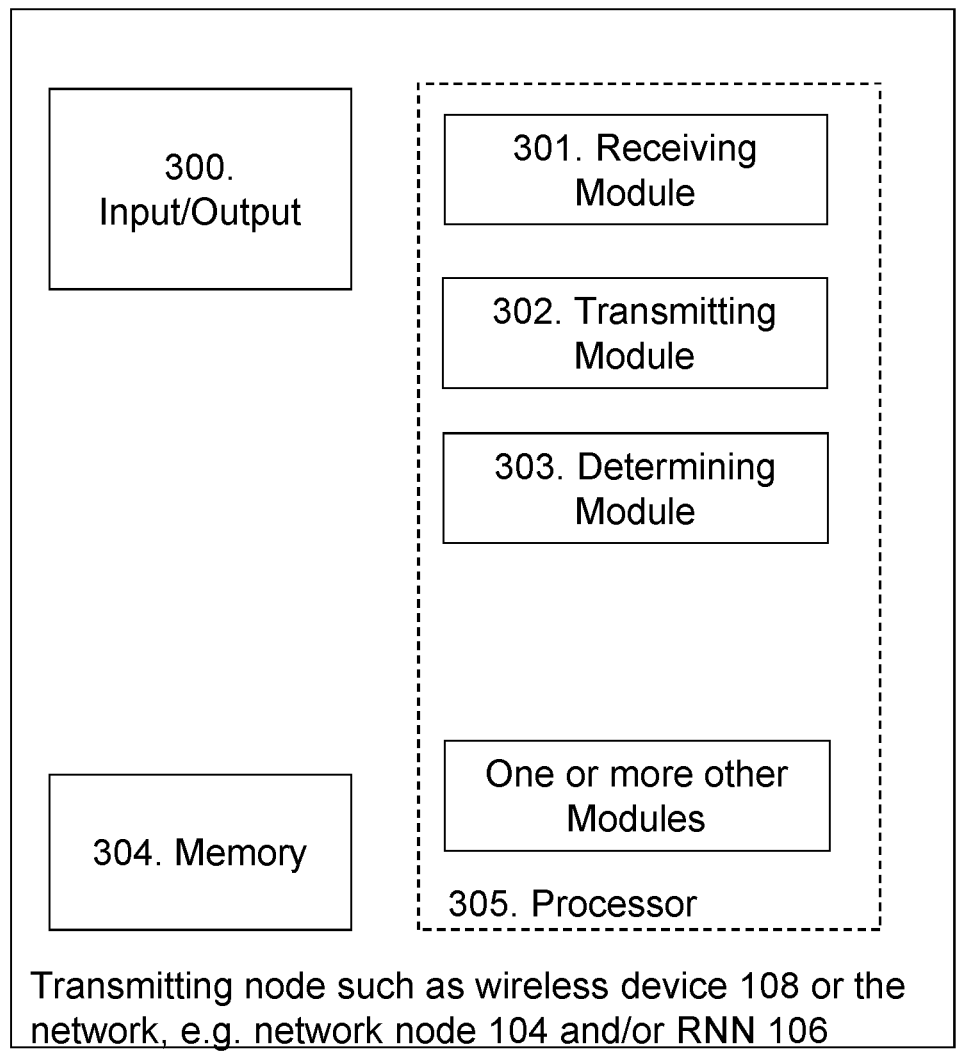
FIG. 3 is a schematic block diagram illustrating embodiments of a transmitting node.

To perform the method for providing improved robustness for communication in the communications network 100, the transmitting node may be configured according to an arrangement depicted in FIG. 3. Especially, embodiments provide for improved robustness of a radio link between the transmitting node, e.g. the RNN 106, and a receiving node, e.g. the wireless device 108. The radio link may be able to operate in different transmission modes, wherein the transmission modes reach different levels of coverage extension. By the expression "the radio link may be able to operate in different transmission modes" when used in this disclosure is meant that the wireless device is able to communicate with the network node and/or the RNN in a radio coverage range exceeding a radio coverage range supported by a 3GPP cellular network, such as a legacy GSM system. The transmitting node and the receiving node are operable in the communications network 100. Both the transmitting node and the receiving node may be a wireless device, such as the wireless device 108, or the network node 104 or the RNN 106. Further, when the transmitting node is the wireless device 108, the receiving node is the network node 104 and/or the RNN 106, and vice versa.

As previously described, the embodiments of the method described in relation to FIG. 11 relate to some second embodiments which will be described below. Further, the transmitting node may be the RNN 106 and the receiving node may be the wireless device 108.

In some embodiments, the transmitting node comprises an input and output interface 300 configured to communicate with one or more receiving nodes, e.g. the wireless device 108 or the network, e.g. the network node 104 and/or the RNN 106, or with one or more other transmitting nodes. The input and output interface 300 may comprise a wireless receiver (not shown) and a wireless transmitter (not shown).

Thus, in embodiments relating to the some second embodiments to be described in more detail below and when the transmitting node is the RNN 106, the RNN 106 comprises the input and output interface 300 configured to communicate with one or more receiving nodes, e.g. the wireless device 108 or the network, e.g. the network node 104 and/or the RNN 106, or with one or more other transmitting nodes.

The transmitting node is configured to receive, e.g. by means of a receiving module 301 configured to receive, a transmission e.g. a signal, from one or more other transmitting node or from a receiving node for example transmitting a response to a received transmission. The receiving module 301 may be implemented by or arranged in communication with a processor 305 of the transmitting node. The processor 306 will be described in more detail below.

Thus, in embodiments relating to the some second embodiments to be described in more detail below and when the transmitting node is the RNN 106, the RNN 106 is configured to receive, by means of the receiving module 301 configured to receive, the transmission e.g. the signal, from one or more other transmitting node or from the receiving node, e.g. the wireless device 108, transmitting for example a response to a received transmission.

The transmitting node is configured to transmit, e.g. by means of a transmitting module 302 configured to transmit, a transmission to one or more receiving nodes or to another transmitting node. The transmitting module 302 may be implemented by or arranged in communication with the processor 305 of the transmitting node.

Thus, in embodiments relating to the some second embodiments to be described in more detail below and when the transmitting node is the RNN 106, the RNN 106 is configured to transmit, by means of the transmitting module 302 configured to transmit, the transmission to one or more receiving nodes, e.g. the wireless device 108, or to another transmitting node.

The RNN 106 is configured to transmit, towards the wireless device 108, a transmission with a first transmission mode associated with a first level of coverage extension.

Further, when a first period of time has elapsed, the RNN 106 is configured to transmit, towards the wireless device 108, the transmission using a second transmission mode associated with a second level of coverage extension. The second level of coverage extension is higher than the first level of coverage extension.

In some embodiments, the RNN 106 is configured to transmit the transmission using the second transmission mode associated with the second level of coverage extension, when the transmitted transmission is determined to not have reached the wireless device 108 within a first period of time.

The first level of coverage extensions may be a first coverage class and the second level of coverage extension may be a second coverage class. Further, the first coverage class may be associated with a first number of repetitions of the transmission and the second coverage class may be associated with a second number of repetitions of the transmission, and the second number of repetitions may be larger than the first number of repetitions.

In some embodiments, the RNN 106 is configured to transmit the transmission with the first transmission mode by further being configured to transmit the transmission with the first transmission mode using an EC-AGCH, an EC-PDTCH, or an EC-PACCH.

In order to inform one or more receiving nodes about the first transmission mode and the second transmission mode, the RNN 106 may be configured to broadcast information relating to the first transmission mode and the second transmission mode.

In some embodiments, when a second period of time has elapsed, the RNN 106 is configured to transmit, towards the wireless device 108, the transmission using a third transmission mode associated with a third level of coverage extension, wherein the third level of coverage extension is higher than the second level of coverage extension.

The transmitting node is configured to determine, e.g. by means of a determining module 303 configured to determine, whether the transmission reached the receiving node. The determining module 303 may be implemented by or arranged in communication with the processor 305 of the transmitting node.

Thus, in embodiments relating to the some second embodiments to be described in more detail below and when the transmitting node is the RNN 106, the RNN 106 is configured to determine, by means of the determining module 303 configured to determine, whether the transmission reached the receiving node, e.g. the wireless device 108.

In some embodiments, the RNN 106 is configured to determine whether or not the transmitted transmission reached the wireless device 108 within the first period of time.

The RNN 106 may be configured to determine whether or not the transmitted transmission reached the wireless device 108 within the first period of time by further being configured to perform one or more out of:

determining whether or not an ACK report or a NACK report received from the wireless device 108 indicates whether or not the transmitted transmission was received by the wireless device 108;

determining whether or not a measuring report received from the wireless device 108 indicates that a received signal strength and/or a received radio quality of the transmitted transmission is low;

determining whether or nota downlink coverage class estimation received from the wireless device 108 indicates that the second transmission mode is to be used for transmission; and determining whether or not a message is transmitted from the wireless device 108 in resources allocated in the transmitted transmission.

The transmitting node may comprise one or more further means configured to perform one or more actions described herein. Embodiments herein comprise one or more other modules configured to realise features and to perform actions described herein.

Thus, in embodiments relating to the some second embodiments to be described in more detail below and when the transmitting node is the RNN 106, the RNN 106 may comprise the one or more further means configured to perform one or more actions described herein.

The transmitting node may also comprise means for storing data. In some embodiments, the transmitting node comprises a memory 304 configured to store the data. The data may be processed or non-processed data and/or information relating thereto. The memory 304 may comprise one or more memory units. Further, the memory 304 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the transmitting node.

Thus, in embodiments relating to the some second embodiments to be described in more, detail below and when the transmitting node is the RNN 106, the RNN 106 may also comprise means for storing data. In some embodiments, the RNN 106 comprises the memory 304 configured to store the data.

Embodiments herein for providing improved robustness for communication in the communications network 100 may be implemented through one or more processors, such as the processor 305 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the transmitting node. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the transmitting node.

Those skilled in the art will also appreciate that the input/output interface 300, the receiving module 301, the transmitting module 302, and the determining module 303, above may refer to a combination of analog and digital circuits, and/or one or more processors configured with software and/or firmware, e.g. stored in the memory 305, that when executed by the one or more processors such as the processors in the transmitting node, e.g. the RNN 106, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 4:
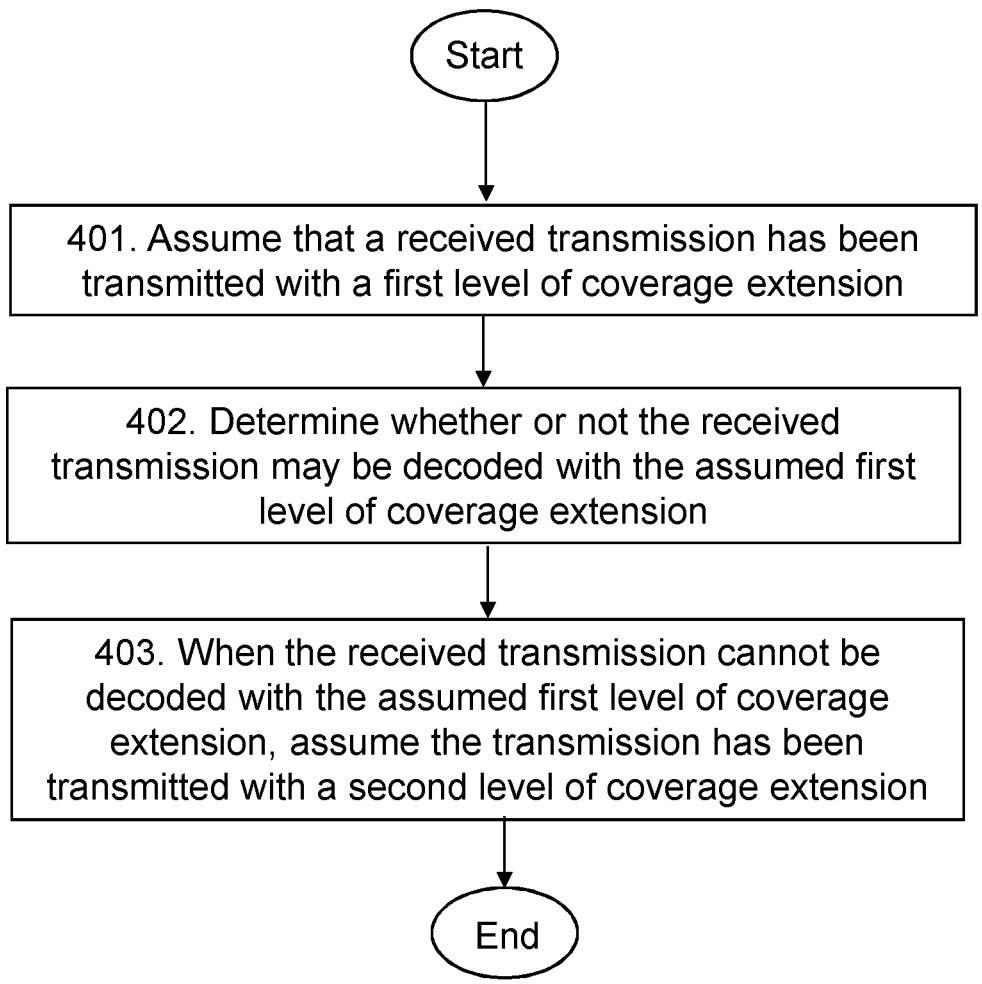
FIG. 4 is a flowchart depicting embodiments of a method performed by a receiving node.

FIG. 4 schematically illustrates embodiments of a method performed by the receiving node for providing improved robustness for communication in the communications network 100. Especially, embodiments provide for improved robustness of a radio link between a transmitting node and the receiving node. The radio link may be able to operate in different transmission modes, wherein the transmission modes reach different levels of coverage extension. The transmitting node and the receiving node are operating in the communications network 100. Both the transmitting node and the receiving node may be a wireless device, such as the wireless device 108, or the network node 104 and/or the RNN 106. Further, when the transmitting node is the wireless device 108, the receiving node is the network node 104 and/or the RNN 106, and vice versa. One or more of the Actions below may be combined and/or performed in another suitable order. Further, one or more actions may be optional.

In Action 401 the receiving node assumes that a received transmission, e.g. a received block, has been transmitted with a first transmission mode associated with a first level of coverage extension, e.g. a first CC.

In Action 402 the receiving node determines whether or not the received transmission may be decoded with the assumed first level of coverage extension. In other words, the receiving node, e.g. the wireless device, determines whether or not the received transmission is decodable with the assumed first level of coverage extension.

In Action 403, when the received transmission cannot be decoded with the assumed first level of coverage extension, the receiving node assumes that the transmission has been transmitted with a second transmission mode associated with a second level of coverage extension, e.g. a second CC, and tries to decode the received transmission with the assumed second transmission mode. As mentioned above, the second level of coverage extension is higher than the first level of coverage extension meaning that the second level of coverage extension is able to operate in a more extreme coverage than the first level of coverage extension.

If the transmission cannot be decoded with the second level of coverage extension, one or more higher levels of coverage extension are assumed until the transmission is decodable or until the maximum level of coverage extension has been reached. Thus, the Actions 402 and 403 may be repeated several times.

Further, an unsuccessful reception may cause the receiving node to listen to a later (re)transmission at a later point in time, with a higher level of coverage extension, e.g. with a higher CC.

As previously mentioned, the transmitting node may be the RNN 106 and the receiving node may be the wireless device 108. This is for example the case in FIG. 12 which is to be described below.

Figure 12:
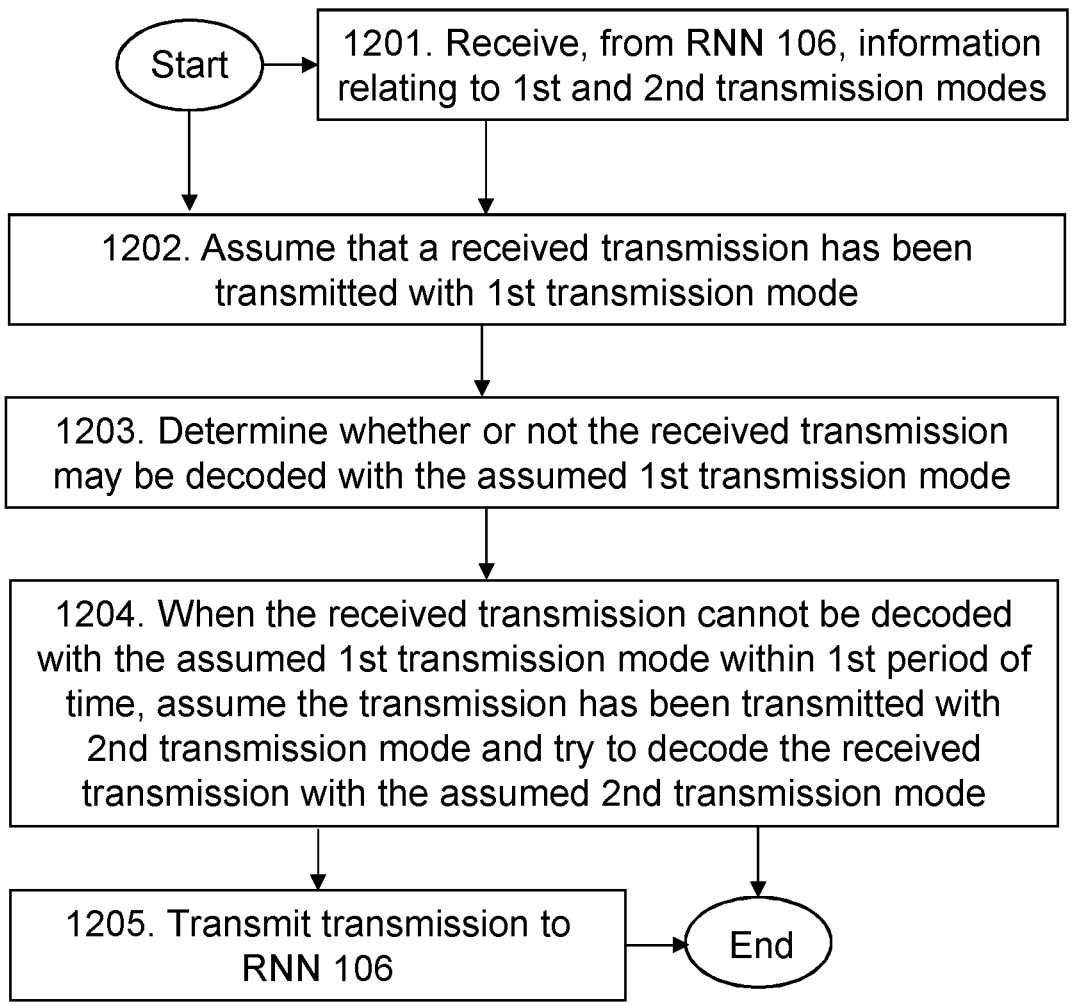
FIG. 12 is a flowchart depicting embodiments of a method performed by a wireless device.

FIG. 12 schematically illustrates embodiments of a method performed by the wireless device 108 for providing improved robustness of a radio link between the RNN 106 and the wireless device 108. Thus, the method is performed by the wireless device 108 for providing improved robustness for communication in the communications network 100. The embodiments of the method described in relation to FIG. 12 relate to some second embodiments as described below. Further, the appended claims also relate to the some second embodiments described below. As previously mentioned, the RNN 106 and the wireless device 108 operate in the communications network 100. One or more of the Actions below may be combined and/or performed in another suitable order. Further, one or more actions may be optional.

Action 1201

In some embodiments, the wireless device 108 receives, from the RNN 106, information relating to the first transmission mode and the second transmission mode.

The first level of coverage extensions may be a first coverage class and the second level of coverage extension may be a second coverage class. Further, the first coverage class may be associated with a first number of repetitions of the transmission and the second coverage class may be associated with a second number of repetitions of the transmission, and the second number of repetitions may be larger than the first number of repetitions.

Action 1202

In order to be able to decode a received transmission, the wireless device 108 assumes that the received transmission has been transmitted with a first transmission mode associated with a first level of coverage extension.

In some embodiments the received transmission is received from the RNN 106 using an EC-AGCH, an EC-PDTCH, or an EC-PACCH.

This relates to Action 401 previously described.

Action 1203

The wireless device 108 determines whether or not the received transmission is decodable with the assumed first transmission mode associated with the first level of coverage extension.

This relates to Action 402 previously described.

Action 1204

When the received transmission is not decodable with the assumed first transmission mode associated with the first level of coverage extension within a first period of time, the wireless device 108 assumes that the received transmission has been transmitted with a second transmission mode associated with a second level of coverage extension and tries to decode the received transmission with the assumed second transmission mode. This may be done during a second period of time. The second level of coverage extension is higher than the first level of coverage extension.

When a second period of time has elapsed, the wireless device 108 may assume a third transmission mode in addition to the assumed second transmission mode and the wireless device 108 may try to decode the received transmission using the assumed third transmission mode in addition to trying to decode the received transmission using the assumed second transmission mode. This may be done during a third period of time.

This relates to Action 403 previously described.

Action 1205

In some embodiments, the wireless device 108 transmits, to the RNN 108, one or more out of:
- an acknowledgement, ACK, report indicating that the received transmission is received by the wireless device 108;
- measuring report indicating that a received signal strength and/or a received radio quality of the received transmission is low;
- a downlink coverage class estimation indicating that the second transmission mode is to be used for transmission; and
- a message in the resources allocated in the received transmission.

Figure 5:
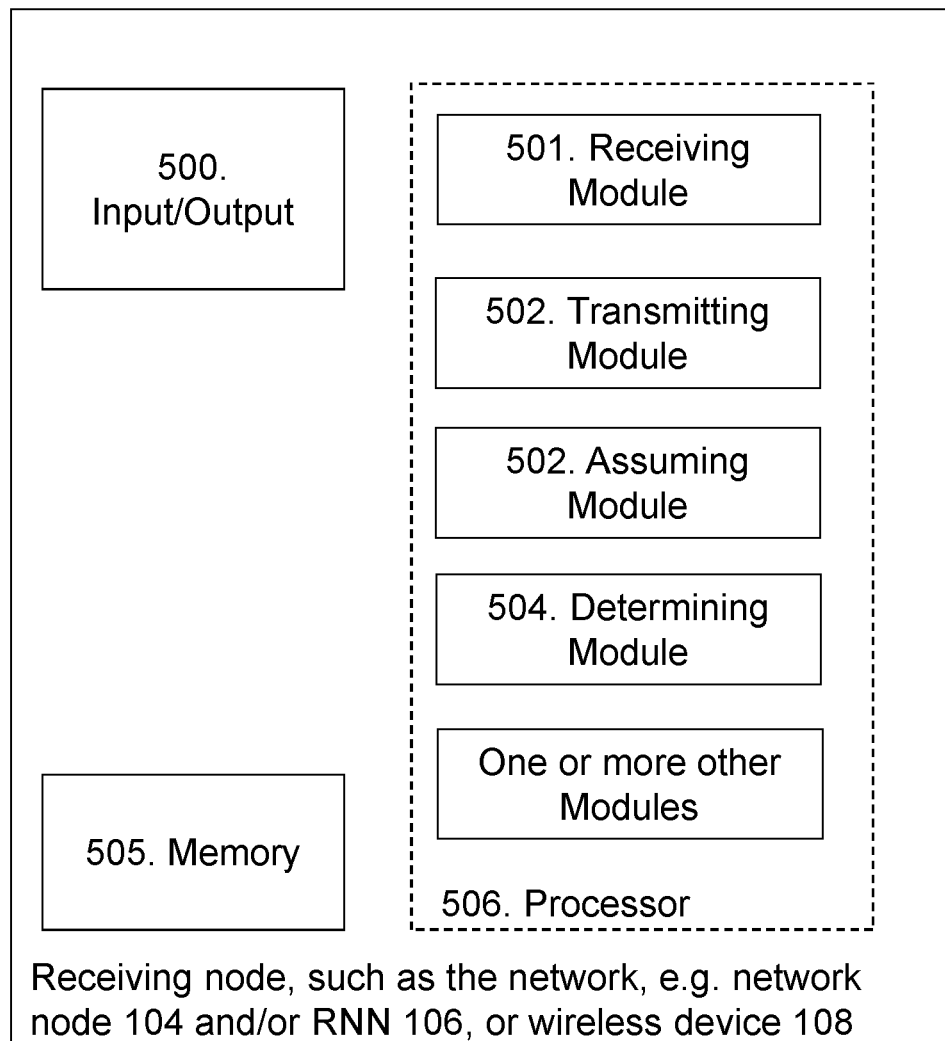
FIG. 5 is a schematic block diagram illustrating embodiments of a receiving node.

To perform the method for providing improved robustness for communication in the communications network 100, the receiving node may be configured according to an arrangement depicted in FIG. 5. Especially, embodiments provide for improved robustness of a radio link between a transmitting node, e.g. the RNN 106, and the receiving node, e.g. the wireless device 108. The radio link may be able to operate in different transmission modes, wherein the transmission modes reach different levels of coverage extension. The transmitting node and the receiving node are operable in the communications network 100. Both the transmitting node and the receiving node ay be a wireless device, such as the wireless device 108, or the network node 104 and/or the RNN 106. Further, when the transmitting node is the wireless device 108, the receiving node is the network node 104 and/or the RNN 106, and vice versa.

As previously described, the embodiments of the method described in relation to FIG. 12 relate to some second embodiments which will be described below. Further, the transmitting node may be the RNN 106 and the receiving node may be the wireless device 108.

In some embodiments, the receiving node comprises an input and output interface 500 configured to communicate with one or more transmitting nodes or one or more other receiving nodes. The input and output interface 500 may comprise a wireless receiver (not shown) and a wireless transmitter (not shown).

Thus, in embodiments relating to the some second embodiments to be described in more detail below and when the receiving node is the wireless device 108, the wireless device 108 comprises the input and output interface 500 configured to communicate with one or more transmitting nodes, e.g. the RNN 106, or one or more other receiving nodes.

The receiving node is configured to receive, by means of a receiving module 501 configured to receive, a transmission, e.g. a signal, from one or more transmitting nodes. The receiving module 501 may be implemented by or arranged in communication with a processor 506 of the receiving node. The processor 506 will be described in more detail below.

Thus, in embodiments relating to the some second embodiments to be described in more detail below and when the receiving node is the wireless device 108, the wireless device 108 is configured to receive, by means of the receiving module 501 configured to receive, a transmission, e.g. a signal, from one or more transmitting nodes, e.g. the RNN 106.

In some embodiments, the wireless device 108 is configured to receive, from the RNN 106, information relating to a first transmission mode associated with a first level of coverage extension and a second transmission mode associated with a second level of coverage extension.

The first level of coverage extensions may be a first coverage class and the second level of coverage extension may be a second coverage class. Further, the first coverage class may be associated with a first number of repetitions of the transmission and the second coverage class may be associated with a second number of repetitions of the transmission, and the second number of repetitions may be larger than the first number of repetitions.

The received transmission may be received from the RNN 108 using an EC-AGCH, an EC-PDTCH, or an EC-PACCH.

The receiving node is configured to transmit, by means of a transmitting module 502 configured to transmit, a transmission, e.g. a response transmission to a transmitting node transmitting a received transmission. The transmitting module 502 may be implemented by or arranged in communication with the processor 506 of the receiving node.

Thus, in embodiments relating to the some second embodiments to be described in more detail below and when the receiving node is the wireless device 108, the wireless device 108 is configured to transmit, by means of the transmitting module 502 configured to transmit, a transmission, e.g. a response transmission to a transmitting node, e.g. the RNN 106, transmitting the received transmission.

In some embodiments, the wireless device 108 is configured to transmit, to the RNN 108, one or more out of:
- an acknowledgement, ACK, report indicating that the received transmission is received by the wireless device 108;
- measuring report indicating that a received signal strength and/or a received radio quality of the received transmission is low;
- a downlink coverage class estimation indicating that the second transmission mode is to be used for transmission; and
- a message in the resources allocated in the received transmission.

The receiving node may be configured to assume, by means of an assuming module 503 configured to assume, a first level of coverage extension. The assuming module 503 may be implemented by or arranged in communication with the processor 506 of the receiving node.

Thus, in embodiments relating to the some second embodiments to be described in more detail below and when the receiving node is the wireless device 108, the wireless device 108 is configured to assume, by means of the assuming module 503 configured to assume, a first level of coverage extension.

The wireless device 108 is configured to assume that a received transmission has been transmitted with the first transmission mode associated with the first level of coverage extension.

Further, the wireless device 108 is configured to assume that the received transmission has been transmitted with a second transmission mode associated with a second level of coverage extension and try to decode the received transmission with the assumed second transmission mode when the received transmission is not decodable with the assumed first transmission mode associated with the first level of coverage extension within a first period of time. The second level of coverage extension may be higher than the first level of coverage extension.

In some embodiments, the wireless device 108 is configured to assume a third transmission mode in addition to the assumed second transmission mode and try to decode the received transmission using the assumed third transmission mode in addition to trying to decode the received transmission using the assumed second transmission mode. This may be the case when a second period of time has elapsed and it may be performed during a third period of time that is a period of time succeeding the second period of time.

The receiving node may be configured to determine, by means of a determining module 503 configured to determine, whether or not a received transmission has been decoded with the assumed first level of coverage extension. The determining module 503 may be implemented by or arranged in communication with the processor 506 of the receiving node. Thus, in embodiments relating to the some second embodiments to be described in more detail below and when the receiving node is the wireless device 108, the wireless device 108 is configured to determine, whether or not the received transmission has been decoded with the assumed first level of coverage extension.

The wireless device 108 is configured to determine whether or not the received transmission is decodable with the assumed first transmission mode associated with the first level of coverage extension. This may be done by determining that the first period of time has elapsed.

The receiving node may comprise one or more further means configured to perform one or more actions described herein. Embodiments herein comprise one or more other modules configured to realise features and to perform actions described herein.

Thus, in embodiments relating to the some second embodiments to be described in more detail below and when the receiving node is the wireless device 108, the wireless device 108 may comprise the one or more further means configured to perform one or more actions described herein.

The receiving node, e.g. the wireless device 108, may also comprise means for storing data. In some embodiments, the receiving node comprises a memory 505 configured to store the data. The data may be processed or non-processed data and/or information relating thereto. The memory 505 may comprise one or more memory units. Further, the memory 505 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the receiving node.

Thus, in embodiments relating to the some second embodiments to be described in more detail below and when the receiving node is the wireless device 108, the wireless device 108 may also comprise means for storing data. In some embodiments, the wireless device 108 comprises the memory 304 configured to store the data.

Embodiments herein for providing improved robustness for communication in the communications network 100 may be implemented through one or more processors, such as the processor 506 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the receiving node, e.g. the wireless device 108. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the receiving node.

Those skilled in the art will also appreciate that the input/output interface 500, the receiving module 501, the transmitting module 502, the assuming module 503, and the determining module 504 above may refer to a combination of analog and digital circuits, and/or one or more processors configured with software and/or firmware, e.g. stored in the memory 505, that when executed by the one or more processors such as the processors in the receiving node, e.g. the wireless device 108, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

BRIEF DESCRIPTION OF SOME FIRST TO SIXTH EMBODIMENTS

Some First Embodiments

In some first embodiments, the wireless device 108 is mandated to monitor downlink blocks corresponding to its own, e.g. an assumed optimal, CC and higher CCs, i.e. the wireless device 108 is able to operate in more extreme coverage. The CC or CCs may be explicitly communicated between the network, e.g. the network node 104 and/or the RNN 106, and the wireless device 108. In some embodiments, the wireless device 108 only monitors downlink blocks corresponding to its own CC, and a one level higher CC.

For example, some embodiments may be realized on the EC-PCH channel in case of the EC-EGPRS system when the wireless device 108 is monitoring its nominal paging group on the DL. In case the corresponding paging blocks cannot be successfully decoded for the CC communicated with the network, e.g. the network node 104 and/or the RNN 106, the wireless device 108 continues monitoring the EC-PCH, according to another set of blocks. For example, if the last DL CC communicated between the network and the wireless device (e.g. indicated by the network to the wireless device 108 or indicated by the wireless device 108 to the network) is CC=N, the wireless device 108 may continue monitoring the EC-PCH, according to another set of blocks than the blocks transmitted as CC=N, or alternatively it monitors the next instance of blocks transmitted as CC=N+1, or alternatively for X additional (e.g. X=2) paging opportunities, each consisting of a set of paging blocks transmitted according to CC=N+1.

Some Second Embodiments

In some second embodiments, the network, e.g. the RNN 106, and the wireless device 108 are aligned on a specific point in time where the CC in DL, UL, or both, is to be increased. The specific point in time may be communicated between the wireless device 108 and the network or be pre-defined, for example in specification text. Thus, it may be communicated that the second transmission mode associated with the second level of coverage extension is to be used instead of the first transmission mode associated with the second level of coverage extension at the specific point in time. This relates to e.g. Action 1101 previously described.

For example in case of FUA in EC-EGPRS, if no ACK/NACK-report and/or assignment message has been successfully received by the wireless device 108 within a certain time, e.g. within the first period of time, since e.g. the last block was transmitted in the previous FUA, the wireless device 108 starts monitoring the DL for an ACK/NACK-report and/or assignment message assuming a more robust CC than was initially communicated between the wireless device 108 and the network, e.g. within the last received assignment message, for the transfer. In other words, when the first period of time has elapsed, the wireless device 108 assumes that a received transmission has been transmitted by the RNN 106 with the second transmission mode and tries to decode the received transmission with the assumed second transmission mode. This relates to e.g. Actions 201, 203, 1102, 1104 and 1202-1204 previously described. If the network, e.g. the RNN 106, after a similar time, e.g. within the first period of time, detects that nothing is received in the resources that were allocated in the last transmitted assignment message to the wireless device 108, the network, e.g. the RNN 106, transmits a subsequent ACK/NACK-report and/or assignment message to the wireless device 108, using a more robust scheme, e.g. using a higher CC, than was indicated in the assignment the network knows was last received by the wireless device 108, e.g. the assignment message used by the wireless device for the first FUA based uplink data transfer. This relates to e.g. Actions 202 and 1103 previously described. The network, e.g. the RNN 106, may transmit multiple subsequent ACK/NACK-reports and/or assignment messages with a more robust scheme in a pre-emptive manner, that is without verifying if the first subsequent ACK/NACK-report and/or assignment message has been received by the wireless device 108. Thus, the network, e.g. the RNN 106, may transmit the second transmission using the second transmission mode towards wireless device 108 when the first period of time has elapsed. This relates to e.g. Action 1104 previously described.

As another example, if a paging block is sent as a re-attempt, signaled for example by a message counter from the SGSN to the Base Station Subsystem (BSS), the network, e.g. the RNN 106, may send the page with a higher CC than communicated. In this case, it is assumed that the wireless device 108 has failed to decode the paging block in its nominal paging block according to its extended Discontinuous Receive (eDRX) cycle, and by doing so will monitor a higher CC in the following eDRX cycles.

Some Third Embodiments

In some third embodiments, the network, e.g. the network node 104 and/or the RNN 106, and/or the wireless device 108 use a specific event where the CC in DL, UL, or both, is to be increased. The event may be communicated between the wireless device 108 and the network or be pre-defined, for example in specification text, or be determined by one of the nodes. In this embodiment the change to a more robust scheme, e.g. to use a higher CC, is triggered by a specific event instead of a specific point in time. Such an event may be, as an example, that the wireless device 108 at certain points in time estimates its DL coverage during an ongoing transfer. If the estimation indicates that the DL coverage has become worse than what was initially communicated between the wireless device and the network for the transfer (e.g. in the assignment message that provided the first radio resources used for a FUA based uplink data transmission), the wireless device 108 starts monitoring the DL using a more robust scheme. The event triggering the network, e.g. the network node 104 and/or the RNN 106, to start using a more robust scheme may then e.g. be that the wireless device 108 informs the network about the worsened DL coverage (e.g. in the header of one or more uplink data blocks sent during the FUA based uplink data transmission). As an alternative, the fact that the network does not receive any (or too few) data blocks and/or poll responses from the wireless device 108, after a certain number of attempts or after a certain time, may be used as a trigger to use a more robust scheme, e.g. to use a higher CC.

Some Fourth Embodiments

In same fourth embodiments, the transmitting node, e.g. the wireless device 108 or the network such as the network node 104 and/or the RNN 106, uses, what is referred to as, in-band signaling (typically a more robust signaling) to communicate the use of a higher CC than last communicated between the wireless device 108 and the network (e.g. the last communicated downlink coverage class may have been received by the network in conjunction with a cell update procedure).

For example in case of EC-EGPRS, the network, e.g. the network node 104 and/or the RNN 106, may use a more robust in-band signaling channel sent within the paging blocks corresponding to the nominal paging group of a wireless device 108 to communicate to the wireless device that it shall continue monitoring the DL according to a CC greater than was last communicated to the network for that wireless device 108, e.g. start to monitor paging blocks associated with a nominal paging group determined using a CC higher than what was last communicated between the wireless device 108 and the network.

Another example in case of EC-EGPRS is where a wireless device 108, after completing a FUA based uplink data transmission but prior to starting to monitor the downlink for a corresponding Ack/Nack response, monitors the DL for in-band signaling channel sent within data blocks or control blocks scheduled for other users on the same physical resource. In this case the in-band signaling should preferably include not only a indicator of increased CC, but also an identifier of the wireless device, e.g. the Temporary Flow Identity (TFI).

A third example, also in case of EC-EGPRS where a wireless device 108 after completing a FUA, when monitoring the downlink for a corresponding Ack/Nack response, receives an EC-PACCH block corresponding to its coverage class, for which decoding fails, decodes a more robust in-band channel contained within the block, and determines that it shall receive an additional block(s) which, when combined with the first received block, corresponds to a higher coverage class.

Some Fifth Embodiments

In some fifth embodiment, the wireless device 108 uses the content, e.g. the header, of one or more uplink data blocks it transmits to indicate a preference to receive a future DL blocks, e.g. Ack/Nack response, with a higher CC, i.e. higher than it was told to use in the last received assignment message, when it starts to monitor the downlink.

For example, this capability may be used to exploit the possibility of a wireless device 108 performing a brief monitoring of the downlink channel quality in EC-EGPRS operation (e.g. shortly before the transmission of the last uplink data block of the FUA based uplink data transmission if one or more transmission gaps have been scheduled as part of the FUA, or while receiving a previous Assignment Message or Ack/Nack response prior to the transmission of the first uplink data block) and determining that a higher CC should be used for the pending corresponding Ack/Nack response on the downlink.

Some Sixth Embodiments

In some sixth embodiments, the receiving node, such as the network, e.g. the network node 104 and/or the RNN 106, or the wireless device 108, receives and buffers blocks corresponding to a higher CC, i.e. higher than what was indicated in the last received assignment message. It then blindly detects if a higher CC was used e.g. by correlating the block(s) corresponding to its CC with the additional received block(s) corresponding to the higher coverage class. If this is the case then it may use the higher CC to improve the robustness of the radio link.

It should be noted that the first to sixth embodiments or parts thereof may be implemented independently, or be combined.

For example, a network could identify by an event according to some third embodiments (not receiving UL data) that the wireless device 108 did not receive the assignment message last transmitted to it, which would trigger the use of a higher CC on the DL. At the wireless device side, a timer according to some second embodiments would trigger the monitoring of a higher CC in the DL for the assignment message from the network.

It should further be noted that the more robust scheme, e.g. the higher CC, that shall be used at the second opportunity may e.g. be based on what scheme that was used for the previous transfer, e.g. the first opportunity, and/or that has been assigned to use for transfer of such messages during the specific connection. As an alternative, it may be pre-defined e.g. to use the most robust of the existing schemes. Or in case this fails, the most robust scheme may be used with one or more immediate repetitions.

Detailed Description of Some First to Sixth Embodiments Briefly Described Above

Some First Embodiments

General Application

In some first embodiments, the network, e.g. the network node 104 and/or the RNN 106, controls what CC to use when transmitting to the wireless device 108. The wireless device 108 in its turn is mandated to monitor the set of CCs possibly used by the network. This has the advantage that the network need not signal to the wireless device 108 what number of repetitions to look for, but the disadvantage that the wireless device will unnecessarily monitor the DL channel more often in the case that no data is transmitted to the device.

Figures 6A, 6B:
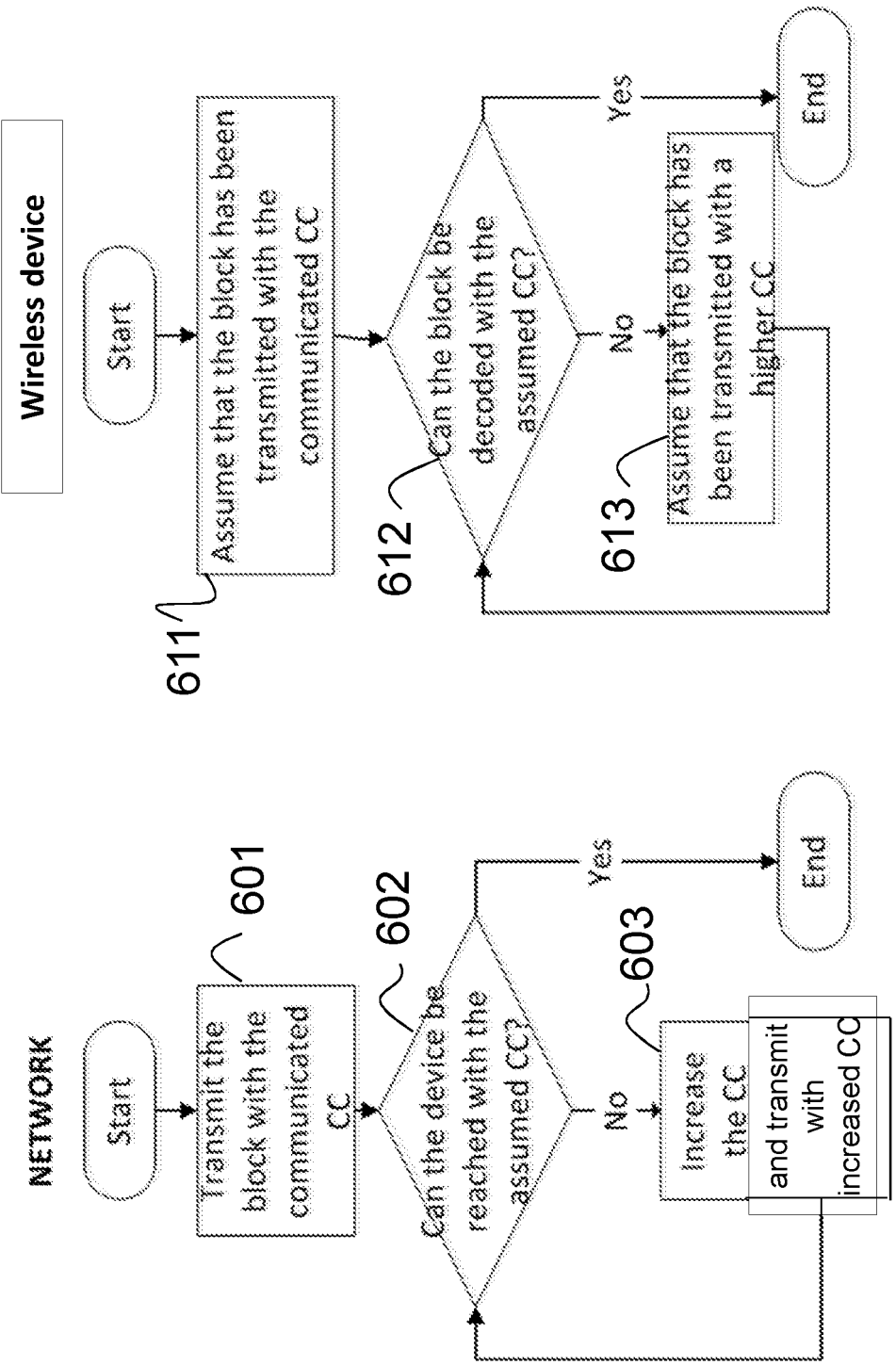
FIGS. 6a and 6B are flowcharts depicting embodiments of methods performed in a network, e.g. a network node and/or a radio network node, and in a wireless device, respectively.

Exemplifying procedures for the network, e.g. the network node 104 and/or the RNN 106, and the wireless device 108 are schematically illustrated in FIGS. 6A and 6B. It may be noted that the network, e.g. the network node 104 and/or the RNN 106, and wireless device 108 behaviour may be specified so that for example only one increase of CC is applied. It may further be noted that in case a maximum CC is specified, it is obviously not possible to increase the CC beyond that class.

Application to EC-EGPRS

In EC-EGPRS the use of different CCs is defined by a different number of blind physical layer transmissions. Each transmission is in itself self-decodable meaning that a wireless device 108 in better coverage may attempt to decode the block after any number of transmissions, and if the block is decoded it may discard the remaining blind transmissions.

Some embodiments disclosed herein may apply to any logical channels, but is here exemplified using the EC-CCCH/D, e.g. the EC-CCCH DL, of which the EC-PCH is part of. Hence, if a network, e.g. the network node 104 and/or the RNN 106, wants to page a wireless device 108, the wireless device 108 will belong to a specific CC which in turn implies that the paging block is transmitted with a specific number of blind transmissions, and that the wireless device 108 monitors those specific numbers of blind transmissions. Assuming that the CC is erroneously estimated, the paging blocks sent by the network will typically be lost in case the wireless device 108 and/or the network, e.g. the RNN 106, estimates its coverage to be better than it actually is. In this case, after a certain number of attempts from the network to reach the wireless device 108, without a response from the wireless device 108, the network may increase the CC assumed (i.e. increasing the number of blind transmissions), and as long as the wireless device 108 is mandated to monitor not only the CC communicated with the network but also higher CCs (for example one CC higher), the network may freely choose any higher CC than communicated and it will still be possible to reach the wireless device 108.

Some Second Embodiments

General Application

In some second embodiments, the network, e.g. the network node 104 and/or the RNN 106, and the wireless device 108 initially make use of the same scheme, e.g. the same Coverage Class, in each direction, according to e.g. a previous communication or a pre-determined value. For a data transfer it may e.g. be initially communicated between the wireless device 108 and the network at the assignment of resources for the transfer. The Coverage Class used may however be different in the uplink and downlink directions.

The network, e.g. the RNN 106, and wireless device 108 are then aligned on a specific point in time where the Coverage Class (CC) in the downlink (DL), uplink (UL), or both directions, is/are to be increased. The specific point in time may be communicated between the wireless device 108 and the network, e.g. the RNN 106. For example, this may be done at assignment of resources for a transfer, may be sent as broadcast information, or may be pre-defined for example in specification text. The specific point in time to change to the increased Coverage Class might however be different on the network side, e.g. the RNN 106 side, and on the wireless device 108 side. This relates to e.g. Actions 1101 and 1201 previously described.

As an option, the increase in CC after the specific point in time, e.g. after the first period of time i.e. when the first period of time has elapsed, may result from determining that the CC that was used prior to that point in time is not considered successful, e.g. due to that the expected messages were not received successfully. This relates to e.g. Actions 202, 203, 402, 1103, 1104, 1203 previously described.

After the specific point in time, e.g. when the first period of time has elapsed, an increased Coverage Class, or another mechanism to achieve a more robust scheme, would thus be applied. Different levels of increase of the Coverage Class are then possible, for example, to use a CC that is one step or level higher than the one that was used prior to the increase, to use a CC that is two steps or levels higher than the one that was used prior to the increase, or to use the highest CC. This relates to e.g. Actions 202, 203, 402, 1103, 1104, 1203 previously described.

As an option, the wireless device 108 may, e.g. after the point in time of increasing the Coverage Class, e.g. when the first period of time has elapsed, use more than one CC when monitoring the downlink. For example, the wireless device 108 may use the CC that is one higher and the CC that is two higher than the CC used prior to the increase, all CCs that are higher than the one that was used before the increase with or without the CC that was used prior to the increase, or the wireless device 108 may use all existing CCs. This relates to e.g. Actions 202, 203, 402, 1103, 1104, 1203 previously described.

The corresponding mechanism may be applied to the uplink where the network, e.g. the RNN 106, and the wireless device 108 are aligned at a specific point in time for the case where it is the Coverage Class in the uplink that is to be increased, i.e. that the network, e.g. the RNN 106, then monitors the uplink using more than one CC.

The specific increase in Coverage Class to apply may be either pre-defined or e.g. be communicated between the network, e.g. the RNN 106, and the wireless device 108. The communication of the increase in the Coverage Class to use may then be done using e.g. broadcast information, control signaling or included as information in data blocks/headers.

Application to EC-EGPRS

Some embodiments disclosed herein may apply to any logical channel for EC-EGPRS. An example is the EC-CCCH/D, which the EC-AGCH is part of. On the EC-AGCH, the network, e.g. the RNN 106, transmits a message to the wireless device 108 either in response to an access request from the wireless device 108 or to transmit a downlink assignment to the wireless device 108 when in Ready state. The EC-AGCH message that is sent in response to an access request from the wireless device 108 is transmitted with a specific number of blind transmissions according to a DL Coverage Class (CC) estimated by the wireless device 108 and communicated to the network, e.g. the network node 104 and/or the RNN 106, at the access request. After the access request the wireless device 108 then monitors the EC-AGCH using the specific numbers of blind transmissions corresponding to the communicated DL CC. This relates to e.g. Actions 201, 401, 1102, and 1202 previously described.

If the wireless device 108, after a certain point in time, e.g. when the first period of time has elapsed, that e.g. may be related to when the access request was performed or when it started monitoring the EC-AGCH, has not received any EC-AGCH message in response to its access request message then it shall apply an increase in CC when monitoring the EC-AGCH. This relates to e.g. Actions 402, 403, 1203, and 1204 previously described. The specific increase in CC may be pre-defined or communicated with/from the network, e.g. the network node 104 and/or the RNN 106, for example as broadcast information. This relates to e.g. Actions 1101 and 1201 previously described. As described earlier the increased CC may be a specific higher CC or a set of several CCs that the wireless device 108 shall monitor. The network, e.g. the RNN 106, would transmit the EC-AGCH message using a higher CC after the specific point in time, e.g. after the first time period, in case the EC-AGCH message transmissions were not successful using the initial CC. This relates to e.g. Actions 203 and 1104 previously described. This lack of successful transmission using the initial CC may be detected by the network, e.g. by the RNN 106, by checking if the wireless device 108 is transmitting in the resources that were allocated in those EC-AGCH messages. As an alternative, the network, e.g. the RNN 106, may perform a pre-emptive transmission of an additional EC-AGCH message with the higher CC after the specific point in time. This relates to e.g. Actions 202, 203, 1103 and 1104 previously described.

As an addition, the network, e.g. the RNN 106, may assign a higher CC for the traffic channel, e.g. the EC-PDTCH, and its associated control channel, e.g. the EC-PACCH, with the EC-AGCH message that is sent with the higher CC compared to the one that was assigned with the original EC-AGCH message, i.e. sent with a lower CC. That way, since a higher CC was needed for the EC-AGCH, it may be assumed that a higher CC is needed also on the EC-PDTCH and/or EC-PACCH. This would then be handled by applying a higher CC for the EC-PDTCH and/or EC-PACCH in the EC-AGCH message sent with a higher CC. The CC assigned for the EC-PDTCH and/or EC-PACCH does not, however, need to be the same as the one used for the transmission of the EC-AGCH message. In addition, the increase of CC for the UL and the DL directions may be handled separately.

In case the network, e.g. the network node 104 and/or the RNN 106, has performed a pre-emptive transmission of an additional EC-AGCH message with the higher CC after the specific point in time, e.g. when the first period of time has elapsed, and that message allocated a higher CC for the EC-PDTCH and/or EC-PACCH, or assigned different uplink resources on the EC-PDTCH and/or EC-PACCH, the network, e.g. the RNN 106, may determine what (EC-AGCH) assignment the wireless device 108 has successfully received based on the resources and/or CC that the wireless device 108 is using on the EC-PDTCH and/or EC-PACCH.

Another example of some second embodiments for EC-EGPRS is for the data transfers on the traffic channel, e.g. the EC-PDTCH, and the associated control channel, e.g. the EC-PACCH. When the data transfer is in the uplink direction, an uplink TBF is assigned, for which a FUA is used. The uplink data is then transferred in uplink allocations that are given to the wireless device 108 in assignment messages. Control messages for the uplink TBF, such as Ack/Nack messages, assignment messages, or messages comprising both an ACK/NACK report and a fixed uplink allocation, are sent from the network, e.g. the RNN 106, to the wireless device 108 in the downlink direction on the EC-PACCH.

If the wireless device 108 does not successfully receive any ACK/NACK report, assignment message or fixed uplink allocation within a certain time X, e.g. within the first period of time, since e.g. the last block was transmitted in the previous FUA, the wireless device 108 may start to monitor the DL EC-PACCH using a more robust scheme, e.g. using an increased CC, than was initially communicated between the wireless device 108 and the network for the transfer. The more robust scheme may also be an increased CC compared to the CC that was used before the specified time has elapsed, e.g. before the first period of time has elapsed. This relates to e.g. Actions 402, 403, 1203, and 1204 previously described.

As an option, the wireless device 108 shall only increase the CC used for DL monitoring after the specified period of time X, e.g. after the first period of time, if it has not successfully received any DL EC-PACCH message within the specified time X, e.g. within the first period of time. This relates to e.g. Actions 403, and 1204 previously described.

The period of time X, e.g. the first period of time, that the wireless device 108 shall wait before starting to monitor the DL EC-PACCH with a more robust scheme, (e.g. using a higher CC), may be either pre-defined or communicated with the network, e.g. in broadcast information or included in an assignment message. In the latter case, the network shall thus transmit the value of time X to the wireless device 108 in either broadcast information, e.g. on the BCCH and/or the EC-BCCH, or in assignment messages on the AGCH, EC-AGCH and/or EC-PACCH. This relates to e.g. Actions 1101 and 1201 previously described.

If the network, e.g. the network node 104 and/or the RNN 106, after a certain period of time Y has elapsed, e.g. when the first period of time has elapsed, detects that nothing is received in the resources that were included in the FUA, allocated to the wireless device 108, the network transmits another (subsequent) message with an ACK/NACK-report and/or FUA to the wireless device 108 using a more robust scheme, e.g. using a higher CC, than was initially used for the transfer or before the period of time Y, e.g. the first period of time, has elapsed. The network, e.g. the network node 104 and/or the RNN 106, may also, as an option, detect that nothing is received in the resources that were included in the FUA, allocated to the wireless device 108, at a point in time that is succeeding the elapsed first period of time. As an alternative, the network may also transmit such a subsequent message with an ACK/NACK-report and/or FUA (after the time Y has elapsed) with a more robust scheme in a pre-emptive manner, i.e. without having verified if the wireless device 108 has transmitted in the previously allocated resources. This relates to e.g. Actions 202, 203, 1103, and 1104 previously described.

As described before, different levels of increase of the Coverage Class may be applied, e.g. by using a CC that is one or two steps/levels higher than the previous or by using the highest CC. As an option the wireless device 108 may monitor the DL EC-PACCH with more than one CC, e.g. using the previous CC and all higher CCs.

When the data transfer is in the downlink direction a downlink TBF is assigned. The downlink data is then transferred on the EC-PDTCH by the network to the wireless device 108. The network polls the wireless device 108 for control messages, e.g. containing ACK/NACK reports, by including poll indications in downlink messages/data blocks. The wireless device 108 is thereby allocated uplink resources to transmit its control message on the EC-PACCH, such as the ACK/NACK message. The network may also transmit downlink control messages on the EC-PACCH to the wireless device 108 during the downlink TBF. In some embodiments it is then proposed that if the wireless device 108 does not successfully receive any downlink data and/or any control messages for a certain period of time Z, e.g. within a first period of time, it shall start to monitor the DL EC-PDTCH and/or the DL EC-PACCH using a more robust scheme, e.g. an increased CC, than was initially communicated between the wireless device 108 and the network for the downlink transfer, or than what was used prior to that the period of time Z has elapsed. It is here then proposed that the network shall start transmitting on the DL EC-PDTCH and/or DL EC-PACCH using the more robust scheme when it, for example:

receives ACK/NACK reports from the wireless device 108 indicating that the DL data blocks are not successfully received by the wireless device 108, receives measurement reports from the wireless device 108 indicating that the received signal strength level and/or radio quality are low, e.g. below a threshold, and/or receives a downlink Coverage Class estimation from the wireless device 108, which e.g. is worse than before or that is indicating a higher CC than what is currently used, and/or does not receive any ACK/NACK reports or other messages from the wireless device 108 in response to being polled by the network.

Thus, the network, e.g. the RNN 106, may determine whether or not the transmitted transmission reached the wireless device 108 within the first period of time by performing one or more out of:

determining whether or not ACK/NACK reports received from the wireless device 108 indicates whether nor not the transmitted transmission was successfully received by the wireless device 108, determining whether or not measurement reports received from the wireless device 108 indicate that the received signal strength level and/or radio quality are low, e.g. below a threshold, and/or determining whether or not a downlink Coverage Class estimation received from the wireless device 108, is worse than before or is indicating use of a higher CC than currently used, and/or determining whether or not a message transmitted from the wireless device 108 is received by the network, e.g. the RNN 106, in response to being polled by the network. If so, the response is received in resources allocated to the wireless device 108 by the RNN 106. Thus, the RNN 106 may determine whether or not the message received from the wireless device is received in allocated resources. This relates to e.g. Actions 202 and 1103 previously described.

One more example is where the wireless device 108 waits for T1 seconds after sending the last block of a fixed uplink allocation before it starts looking for a Packet Uplink Ack/Nack (PUAN) message. From that point if it hasn't received a PUAN after T2 additional seconds (i.e. T1+T2 seconds after sending the last block of a fixed uplink allocation) it begins looking for a more robust PUAN. So if the first, less robust, PUAN provides a new fixed uplink allocation the receiving node waits for time T1+T2+T3 seconds before sending a more robust PUAN, wherein T3 is set to a value large enough to ensure the device should have sent at least the first uplink block of the new fixed uplink allocation by the end of the time period spanned by T1+T2+T3. The Packet Uplink Ack/Nack message referred to in this document may also be the EC-EGPRS Packet Uplink Ack/Nack message, which is sent on the EC-PACCH.

Some Third Embodiments

Some third embodiments correspond to some second embodiments, with the difference that the change to a more robust scheme, e.g. to use a higher CC, is triggered by a specific event instead of a specific point in time. Such an event may be, as an example, that the wireless device 108 at certain points in time estimates its DL coverage, e.g. as Coverage Class, during an ongoing transfer. If the estimation indicates that the DL coverage has become worse than what was initially communicated between the wireless device 108 and the network, e.g. the network node 104 and/or the RNN 106, for the transfer, the wireless device 108 starts monitoring the DL using a more robust scheme. The event triggering the network to start using a more robust scheme may then e.g. be that the wireless device 108 informs the network about the worsened DL coverage. As an alternative, the fact that the network does not receive any, or too little amount of, data/response from the wireless device 108, after a certain number of attempts or after a certain period of time, may be used as a trigger to use a more robust scheme, e.g. to use the higher CC. Another example of an event that triggers an increase in CC is the case where the initially used CC is not considered successful in that the expected downlink messages are not received successfully after completion of an uplink data transfer.

Some Fourth Embodiments

General Application

Figures 7A, 7B:
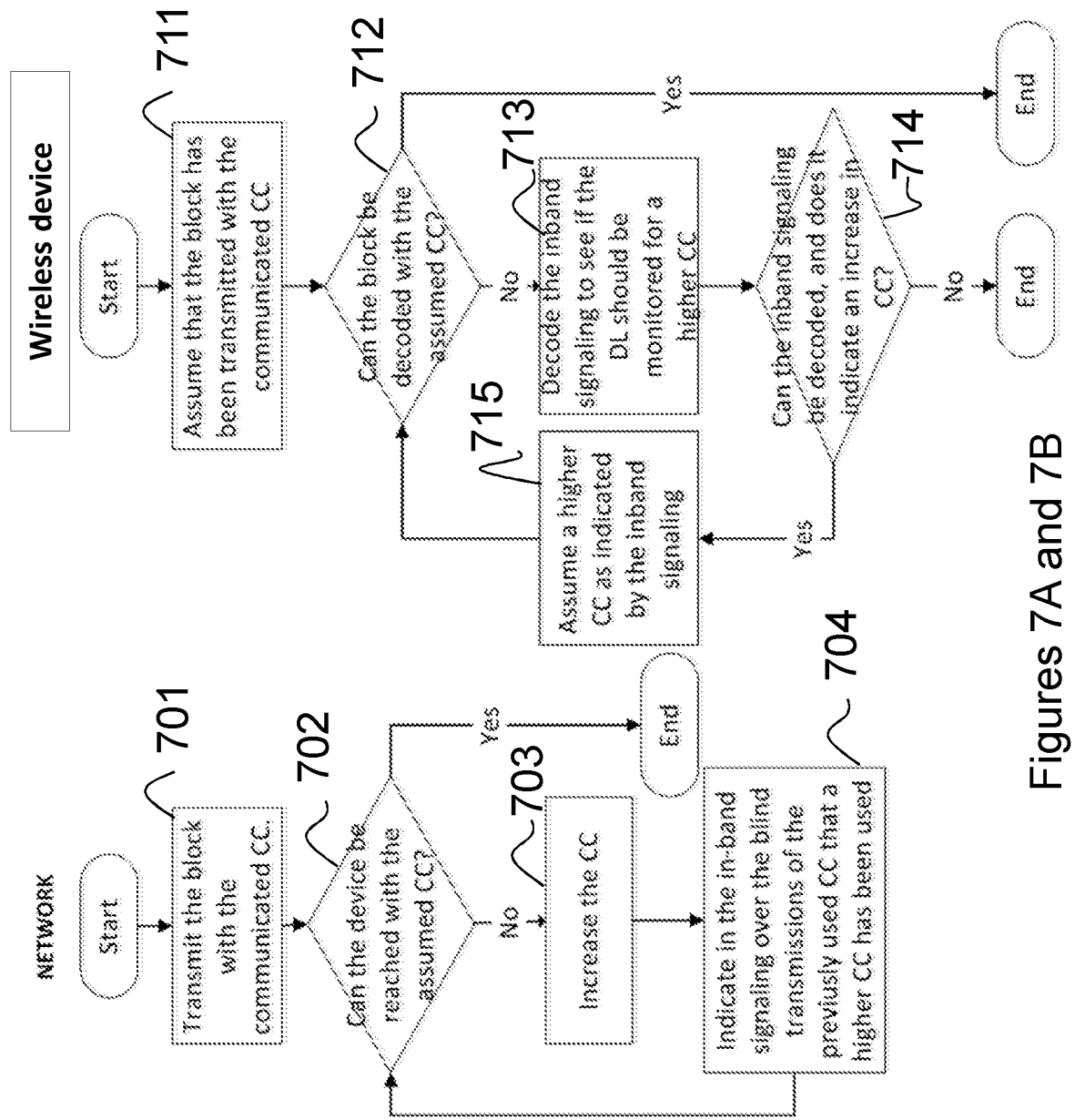
FIGS. 7A-7D are flowcharts depicting embodiments of methods performed in a network, e.g. a network node and/or a radio network node, and in a wireless device, respectively.

A general application of the some fourth embodiments is that the transmitting node, such as the wireless device 108 or the network, e.g. the RNN 106, uses, what is referred to as, in-band signaling (typically a more robust signaling) to communicate the use of a higher CC than the previously CC communicated between the wireless device 108 and the network. Exemplifying procedures performed by the network, e.g. the network node 104 and/or the RNN 106, and the wireless device 108 are schematically illustrated in FIGS. 7A and 7B. It is here assumed that the network attempts to reach the wireless device 108 with the communicated CC before using a higher CC, this type of behaviour is of course up to implementation. In case there is no resource shortage in the network a simple implementation would be to, for example, always transmit the block with a higher CC whereby in-band signaling is used to indicate that a higher CC is used for block transmission. In most cases the wireless device 108 may decode the block after receiving fewer blind transmissions than the total number of transmissions corresponding to the communicated CC, and hence will not monitor the rest (in which case the network will waste these resources).

In some cases the additional block(s) corresponding to a higher CC are transmitted in parallel to the block(s) corresponding to the communicated CC. For example, a high CC may be transmitted using more timeslots than a low CC. In this case, the receiving node, such as the wireless device 108 or the network, e.g. the network node 104 and/or the RNN 106, may not use the in-band signaling in the block(s) of the communicated CC to determine if additional block(s) corresponding to a higher CC should be received, since the additional block(s) will be transmitted in parallel to the in-band signaling. In this case, the receiving node must receive and buffer blocks corresponding to the higher CC before decoding the in-band signaling.

Figures 7C, 7D:
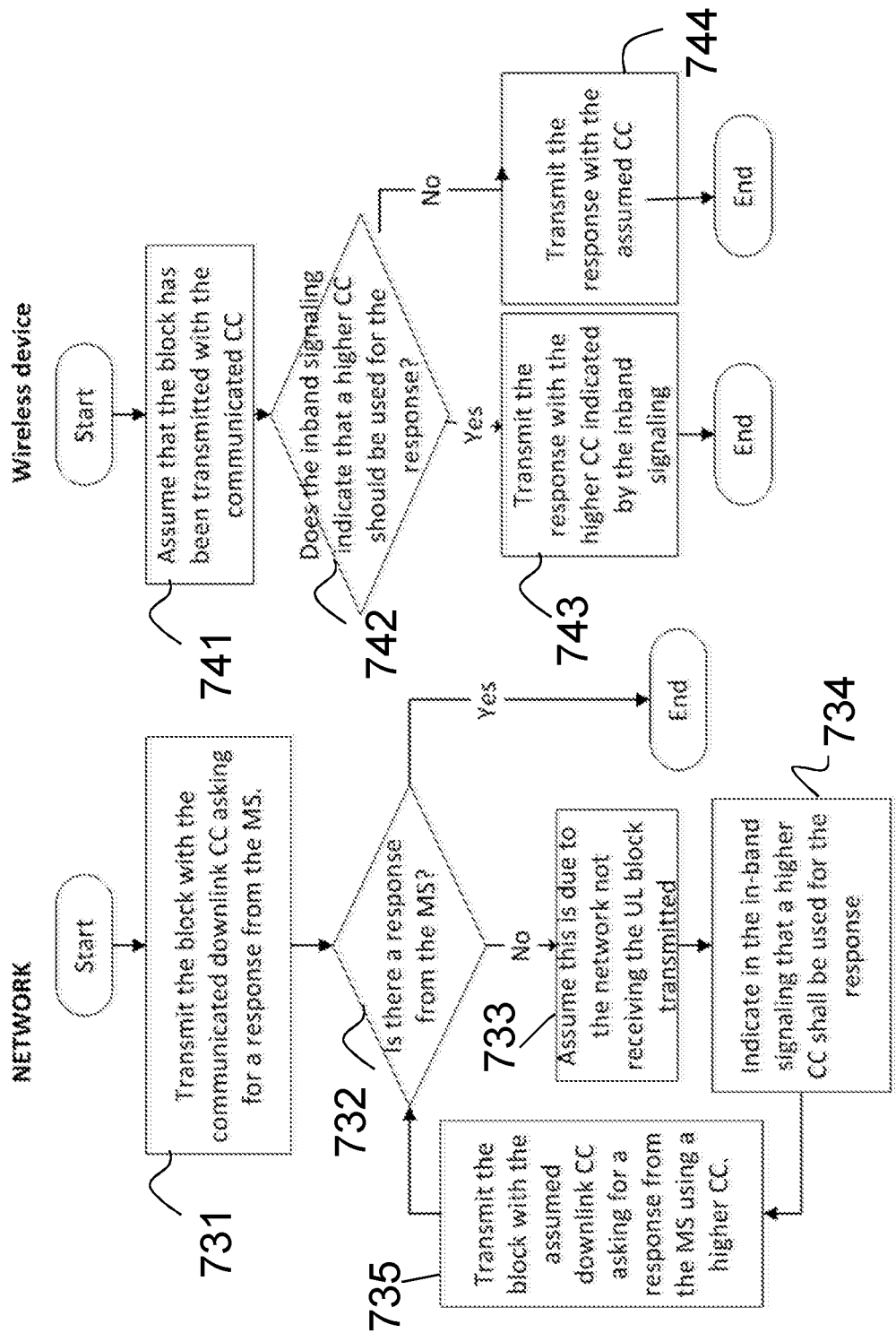

A variation of some fourth embodiments is applied in the opposite direction, meaning that the response to the in-band signaling is an increase of the CC in the opposite direction to the one where the in-band signaling was received. One example may for example be a network, e.g. the network node 104 and/or the RNN 106, that polls the wireless device 108 for a control message response, where the network knows from previous polling attempts that the poll response has not been received and hence may indicate that the poll response should be sent with a higher CC than the CC communicated. Exemplifying procedures performed by the network, e.g. the network node 104 and/or the RNN 106, and the wireless device 108 for such a variation are schematically illustrated in FIGS. 7C and 7D.

Application to EC-EGPRS

In EC-EGPRS the in-band signaling may for example be a set of one or more of;

1. Separately encoded/decoded bits in the block,
2. different phase information carried across the blind transmissions,
3. modulation specific characteristics, for example using the opposite modulation index in GMSK, or,
4. different training sequences
5. bits contained in a robustly encoded part of the block, e.g. the RLC/MAC header.

Here, the first alternative is in more detailed described for the downlink channels EC-PACCH, EC-PCH and EC-AGCH.

Figure 8:
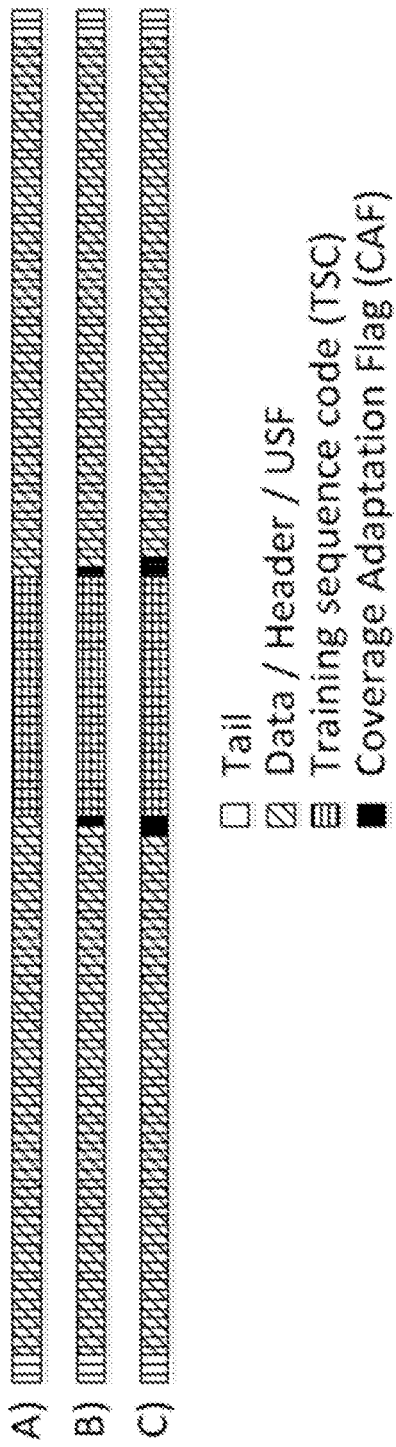
FIG. 8 schematically illustrates an exemplifying burst format for a DL EC-CCCH, e.g. an EC-PCH and an EC-AGCH.

In FIG. 8 an exemplifying burst format for the DL EC-CCCH, i.e. EC-PCH and EC-AGCH is shown, wherein A) indicates the legacy burst format; B) and C) indicate the burst format with two possible implementations of option 1 (using 2 or 4 symbols for the Coverage Adaptation Flags (CAF) respectively) above, having a separately block coded field for CAF.

Figure 9:
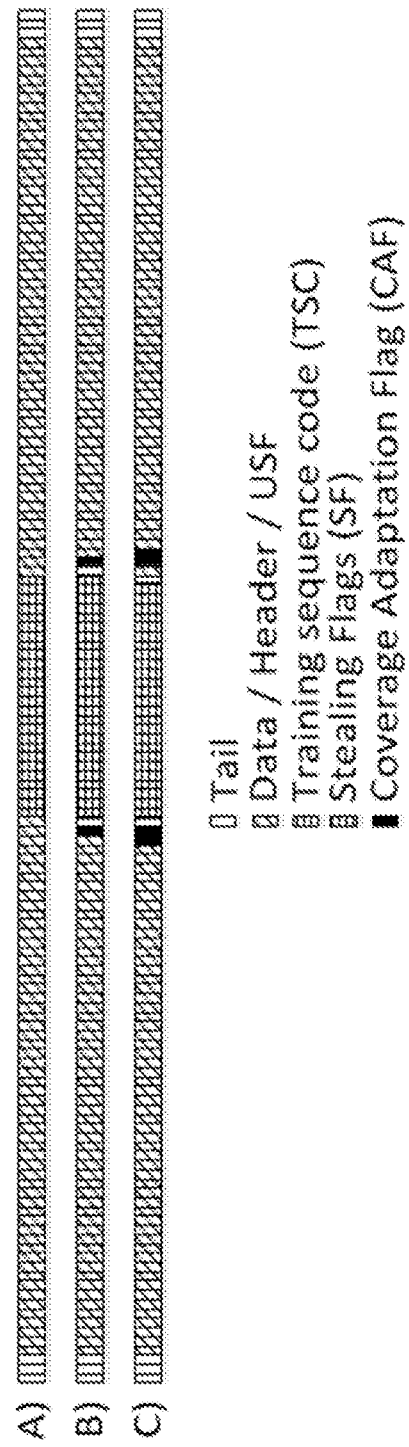
FIG. 9 schematically illustrates an exemplifying burst format for a EC-PACCH.

A similar burst format applies to EC-PACCH. This is schematically illustrated in FIG. 9. Here the legacy burst format already comprises a set of Stealing Flags that need to be catered for when adding the CAF.

Figure 10:
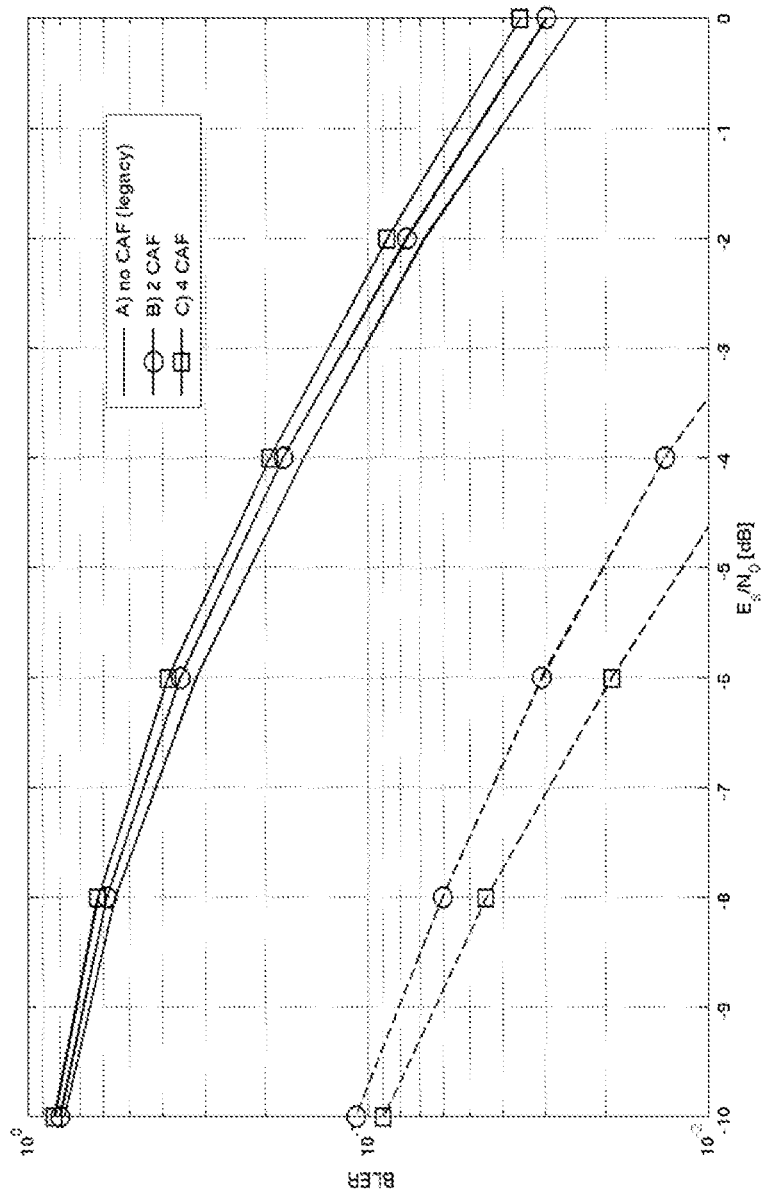
FIG. 10 schematically illustrates link performance for an EC-CCCH in a legacy case and when using CAF.

The performance of EC-PCH/EC-AGCH has been investigated by link level simulations using the three different configurations in FIG. 8. FIG. 10 schematically illustrates link performance for EC-CCCH in the legacy case and when using CAF. Further, data performance is shown in solid lines and CAF performance in dashed lines.

As seen in FIG. 10, the CAF is roughly 6-7 dB more robust than the data performance and hence may be seen as an in-band signaling channel that may operate at sufficiently low SNR for a wireless device 108 that should be using a higher CC than communicated with the network. For example, even if the data performance is around 60% (SNR=−8 dB), the CAF is still performing with a BLER of around 5%. The inclusion of CAF only has a minor impact to the data performance of 0.3 dB (2 CAF) or 0.6 dB (4 CAF).

In the variation of these embodiments, when the in-band signaling is used to indicate the CC adaptation in the opposite direction, this may for example be indicated in/by an RLC/MAC header, an LLC length indicator, and/or TSC selected.

Here, a first alternative is in more detailed outlined where a new field in the RLC/MAC header may for example indicate as given in Table 1 below, which table exemplifies the CAF in the RLC/MAC header.

| CAF (2 bits) | Meaning |
| --- | --- |
| 00 | Use the communicated CC in the response |
| 01 | Use a one step higher CC in the response |
| 10 | Use a two step higher CC in the response |
| 11 | Reserved |

Table 1 serves merely as an example and may instead indicate the specific CC to use instead of a relative CC to the communicated one, as shown in Table 2 below, which table exemplifies the CAF in the RLC/MAC header.

| CAF (2 bits) | CC to be used in the response |
|---|---|
| 00 | CC1 |
| 01 | CC2 |
| 10 | CC3 |
| 11 | CC4 |

As another example, a single bit may be comprised in the RLC/MAC header indicating whether an increase in CC may be used in the opposite direction or not. The specific increase that may be applied in the opposite may then either be pre-determined (e.g. to use a CC that is one step higher) or be informed in control messages or in broadcast information from the network to the wireless device.

Some Fifth Embodiments

General Application

The wireless device 108 uses the content, e.g. the header, of one or more uplink data blocks it transmits to indicate a preference to receive a future DL blocks, e.g. Ack/Nack response, with a higher CC, i.e. higher than it was told to use in the last received assignment message, when it starts to monitor the downlink.

Application to EC-EGPRS

For the case of EC-EGPRS, this capability may be used to exploit the possibility of a wireless device 108 performing a brief monitoring of the downlink channel quality in EC-EGPRS operation (e.g. shortly before the transmission of the last uplink data block of the FUA based uplink data transmission if one or more transmission gaps have been scheduled as part of the FUA, or while receiving a previous Assignment Message or Ack/Nack response prior to the transmission of the first uplink data block) and determining that a higher CC should be used for the pending corresponding Ack/Nack response on the downlink.

The indication may for example be done in the RLC/MAC header of the RLC data block transmitted in the UL, to indicate that a response with the DL EC-PACCH should be transmitted with a higher CC than the one communicated with the network, e.g. the RNN 106.

Some Sixth Embodiments

General Application

It is here assumed that blind transmissions are used to extend coverage, and further that the resources used for a given CC is a subset of the resources used for a higher CC.

The receiving node, such as the wireless device 108 or the network, e.g. the network node 104 and/or the RNN 106, receives and buffers blocks corresponding to a higher CC than what was indicated in the last received assignment message. It then blindly detects if a higher CC was used e.g. by calculating a complex correlation between the block(s) corresponding to its CC and the additional received block(s) corresponding to the higher coverage class. If the magnitude of the complex correlation is high, the wireless device 108 assumes that a higher CC has been used by the transmitting node, such as the wireless device 108 or the network, e.g. the network node 104 and/or the RNN 106, (i.e., that the additional received blocks are repetitions of the blocks corresponding to its CC), and combines all blocks. If the magnitude of the complex correlation is low, it assumes that the agreed CC has been used by the transmitting node (i.e., that the additional received blocks are not repetitions of the blocks corresponding to its CC), and either discards the additional blocks, or attempts to decode them separately from the blocks corresponding to its CC.

In some embodiments, the transmitting node, such as the wireless device 108 or the network, e.g. the network node 104 and/or the RNN 106, may choose to use a higher CC than agreed for any reason described in some previous embodiments.

Application to EC-EGPRS

In EC-EGPRS it may happen that the additional blocks corresponding to a higher CC are transmitted in parallel to the blocks corresponding to the agreed CC. In particular, on EC-PACCH and EC-PDTCH a high CC may be transmitted using more timeslots than a low CC. In this case, the receiving node, such as the wireless device 108 or the network, e.g. the network node 104 and/or the RNN 106, according to some fourth embodiments may receive and buffer blocks corresponding to the higher CC before decoding the in-band signaling.

In this case, blind detection using e.g. the correlation described above may be used as an alternative to in-band signaling.

Exemplifying blind transmissions on EC-PACCH are illustrated in FIG. 13. The bursts B1, B2, B3, B4 constitute one radio block. The bursts comprised within the solid frame correspond to the transmissions for CC1. The bursts comprised in the dashed frame correspond to the additional transmissions for CC2.

A receiving node, such as the wireless device 108 or the network, e.g. the RNN 106, in CC1 is in this example assigned timeslot number (TN) 2. Still, it receives and buffers TN 2, 3, 4 and 5, corresponding to an assignment for CC2. If the correlation between the received signal in TN 2 and TN 3, 4 and 5 is high, the receiving node concludes that CC2 has been used by the transmitting node, and combines the bursts of TN 2, 3, 4 and 5.

If the receiving node, such as the wireless device 108 or the network, e.g. the network node 104 and/or the RNN 106, does not have capability to buffer all the received bursts, the blind detection of coverage class may also be done per TDMA frame. The receiving node then receives and buffers the signals in TN 2, 3 4, and 5 in TDMA frame N, and then proceeds with detection of repetition of burst B1 (using e.g. complex correlation). If repetition is detected, the signals of TN 2, 3, 4 and 5 are combined. The receiving node then proceeds with TDMA frame N+1 in a similar manner.

Detection during TDMA frame N of the use of a certain CC may be memorized and used as input in the detection during subsequent TDMA frames.

When the word "comprise" or "comprising" is used in this disclosure it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Abbreviation Explanation
3GPP Third Generation Partnership Project
ACK Acknowledgement
AGCH Access Grant Channel
AP Access Point
ASIC Application-Specific Integrated Circuit
BCCH Broadcast Control Channel
BLER Block Error Ratio
BS Base Station
BSC Base Station Controller BSS Basic Service Set
BSS Base Station Subsystem
BTS Base Transceiver Station
CAF Coverage Adaptation Flag
CC Coverage Class
CC1 Coverage Class 1
CC2 Coverage Class 2
CC3 Coverage Class 3
CC4 Coverage Class 4
CD Compact Disc
D2D Device-to-Device
DAS Distributed Antenna System
dB Decibel
DL Downlink
EC Extended Coverage
EC-AGCH Extended Coverage Access Grant Channel
EC-BCCH Extended Coverage Broadcast Control Channel
EC-CCCH Extended Coverage Common Control Channel
EC-EGPRS Extended Coverage Enhanced GPRS
EC-GSM Extended Coverage for GSM
EC-GSM-IoT Extended Coverage GSM Internet of Things
EC-PACCH Extended Coverage Packet Access Control Channel
EC-PCH Extended Coverage Paging Channel
EC-PDTCH Extended Coverage Packet Data Traffic Channel
EDGE Enhanced Data rates for GSM Evolution
eDRX Extended Discontinuous Reception
eNB E-UTRAN Node B
FUA Fixed Uplink Allocation
GERAN GSM EDGE Radio Access Network
GGSN Gateway GPRS Support Node
GMSK Gaussian Minimum Shift Keying
GPRS General Packet Radio Service
GSM Global System for Mobile communications
IoT Internet of Things
LEE Laptop Embedded Equipped
LLC Logical Link Control
LME Laptop Mounted Equipment
LTE Long Term Evolution
M2M Machine to machine
MAC Medium Access Control
MCG Master Cell Group
MDT Mobile Data Terminal
MeNB Master eNodeB
MME Mobility Management Entity
MNO Mobile Network Operators
MS Mobile Station
MSC Mobile Switching Centre
MSR Multi-Standard Radio
MTC Machine Type Communication
NACK Negative Acknowledgement
NB Node B
OSS Operations Support System
PDA Personal Digital Assistant
PUAN Packet Uplink Ack/Nack
RAN Radio Access Network
RBS Radio Base Station
RLC Radio Link Control
RNC Radio Network Controller
RNN Radio Network Node
ROM Read-Only Memory
RRH Remote Radio Head
RRU Remote Radio Unit
SCG Secondary Cell Group
SeNB Secondary eNodeB
SGSN Serving GPRS Support Node
SMLC Serving Mobile Location Centre
SNR Signal-to-Noise Ratio
SoC System-on-a-Chip
SON Self Organizing Network
STA Station
TBF Temporary Block Flow
TCH Traffic Channel
TDMA Time Division Multiple Access
TFI Temporary Flow Identity
TN Timeslot Number
TR Technical Report
TS Technical Specification
TSC Training Sequence Code
UE User Equipment
UL Uplink
UMTS Universal Mobile Telecommunications System
USB Universal Serial Bus
WCDMA Wideband Code Division Multiple Access
WiMAX Worldwide Interoperability for Microwave Access
WLAN Wireless Local Area Network

The invention claimed is:
1. A method performed by a Radio Network Node, RNN, for providing improved robustness of a radio link between the RNN and a wireless device, wherein the RNN and the wireless device operate in a communications network, wherein the method comprises: —transmitting, by an RNN towards the wireless device, a first transmission with a first transmission mode associated with a first level of coverage extension; —determining, by the RNN, if the transmitted first transmission reached and was decoded by the wireless device within a first period of time by determining if a message is received from the wireless device in resources allocated in the transmitted first transmission, —when the first period of time has elapsed and when the transmitted first transmission is determined to not have reached the wireless device or to have been received but not decoded by the wireless device within the first period of time, transmitting, by the RNN towards the wireless device, a second transmission using a second transmission mode associated with a second level of coverage extension, wherein the second level of coverage extension is higher than the first level of coverage extension; and—broadcasting information relating to the first transmission mode and the second transmission mode.

2. The method of claim 1, wherein the first level of coverage extensions is a first coverage class associated with a first number of repetitions of the transmission and the second level of coverage extension is a second coverage class is associated with a second number of repetitions of the transmission, and wherein the second number of repetitions is larger than the first number of repetitions.

3. The method of claim 1, wherein the transmitting of the first transmission with the first transmission mode further comprises:
transmitting the first and second transmissions using an Extended Coverage Access Grant Channel, EC-AGCH, an Extended Coverage Packet Data Traffic Channel, EC-PDTCH, or an Extended Coverage Packet Access Control Channel, EC-PACCH.

4. The method of claim 1, further comprising:
when a second period of time has elapsed, transmitting, towards the wireless device, a third transmission using a third transmission mode associated with a third level of coverage extension, wherein the third level of coverage extension is higher than the second level of coverage extension.

5. A method performed by a wireless device for providing improved robustness of a radio link between a RNN and the wireless device, wherein the RNN and the wireless device operate in a communications network, wherein the method comprises:

determining, by a wireless device, if a received first transmission is decodable with a first transmission mode associated with a first level of coverage extension;

when the received first transmission is not decodable with the first transmission mode associated with the first level of coverage extension within a first period of time; trying, by the wireless device, to decode a received second transmission with a second transmission mode associated with a second level of coverage extension, wherein the second level of coverage extension is higher than the first level of coverage extension;

when the second transmission is decoded, transmitting, by the wireless device to the RNN, in resources allocated in the second transmission; and receiving, from the RNN, information relating to the first transmission mode and the second transmission mode.

6. The method of claim 5, wherein the first level of coverage extensions is a first coverage class associated with a first number of repetitions of the transmission and the second level of coverage extension is a second coverage class associated with a second number of repetitions of the transmission, and wherein the second number of repetitions is larger than the first number of repetitions.

7. The method of claim 5, wherein the received first and second transmissions are received from the RNN using an Extended Coverage Access Grant Channel, EC-AGCH, an Extended Coverage Packet Data Traffic Channel, EC-PDTCH, or an Extended Coverage Packet Access Control Channel, EC-PACCH.

8. The method of claim 5, further comprising:

when a second period of time has elapsed, trying to decode the received third transmission using a third transmission mode in addition to trying to decode the received second transmission using the second transmission mode.

9. A Radio Network Node, RNN, for providing improved robustness of a radio link between the RNN and a wireless device, wherein the RNN and the wireless device are configured to operate in a communications network, wherein the RNN is configured to: —transmit, by the RNN towards the wireless device, a first transmission with a first transmission mode associated with a first level of coverage extension; - determine, by the RNN, if the transmitted first transmission reached and was decoded by the wireless device within a first period of time by determining if a message is received from the wireless device in resources allocated in the transmitted first transmission, —when the first period of time has elapsed and when the transmitted first transmission is determined to not have reached the wireless device or to have been received but not decoded by the wireless device within the first period of time, transmit, by the RNN towards the wireless device, a second transmission using a second transmission mode associated with a second level of coverage extension, wherein the second level of coverage extension is higher than the first level of coverage extension; and - broadcast information relating to the first transmission mode and the second transmission mode.

10. The RNN of claim 9, wherein the first level of coverage extensions is a first coverage class associated with a first number of repetitions of the transmission and the second level of coverage extension is a second coverage class associated with a second number of repetitions of the transmission, and wherein the second number of repetitions is larger than the first number of repetitions.

11. The RNN of claim 9, wherein the RNN is configured to transmit the first and second transmissions by further being configured to:

transmit the first and second transmissions using an Extended Coverage Access Grant Channel, EC-AGCH, an Extended Coverage Packet Data Traffic Channel, EC-PDTCH, or an Extended Coverage Packet Access Control Channel, EC-PACCH.

12. The RNN of claim 9, further being configured to:

when a second period of time has elapsed, transmit, towards the wireless device, a third transmission using a third transmission mode associated with a third level of coverage extension, wherein the third level of coverage extension is higher than the second level of coverage extension.

13. A wireless device for providing improved robustness of a radio link between a RNN and the wireless device, wherein the RNN and the wireless device are configured to operate in a communications network, wherein the wireless device is configured to:

determine, by the wireless device, if a received first transmission is decodable with a first transmission mode associated with a first level of coverage extension;

when the received first transmission is not decodable with the first transmission mode associated with the first level of coverage extension within a first period of time, try, by the wireless device, to decode a received second transmission with a second transmission mode associated with a second level of coverage extension, wherein the second level of coverage extension is higher than the first level of coverage extension;

when the second transmission is decoded, transmit, by the wireless device to the RNN, in the resources allocated in the second transmission; and receive, from the RNN, information relating to the first transmission mode and the second transmission mode.

14. The wireless device of claim 13, wherein the first level of coverage extensions is a first coverage class associated with a first number of repetitions of the transmission and the second level of coverage extension is a second coverage class associated with a second number of repetitions of the transmission, and wherein the second number of repetitions is larger than the first number of repetitions.

15. The wireless device of claim 13, wherein the received first and second transmissions are received from the RNN using an Extended Coverage Access Grant Channel, EC-AGCH, an Extended Coverage Packet Data Traffic Channel, EC-PDTCH, or an Extended Coverage Packet Access Control Channel, EC-PACCH.

16. The wireless device of claim 13, further being configured to:

when a second period of time has elapsed, try to decode a received third transmission using a third transmission mode in addition to trying to decode the received second transmission using the second transmission mode.

17. A non-transitory computer-readable medium having stored thereon computer-executable instructions which, when executed on at least one processor, causes the at least one processor to: transmit, by a Radio Network Node (RNN) towards a wireless device, a first transmission with a first transmission mode associated with a first level of coverage extension; determine, by the RNN, if the transmitted first transmission reached and was decoded by the wireless device within a first period of time by determining if a message is received from the wireless device in resources allocated in the transmitted first transmission, when the first period of time has elapsed and when the transmitted first transmission is determined to not have reached the wireless device or to have been received but not decoded by the wireless device within the first period of time, transmit, by the RNN towards the wireless device, a second transmission using a second transmission mode associated with a second level of coverage extension, wherein the second level of coverage extension is higher than the first level of coverage extension; and broadcast information relating to the first transmission mode and the second transmission mode.

* * * * *